US011030657B1

(12) United States Patent
Palmer

(10) Patent No.: US 11,030,657 B1
(45) Date of Patent: Jun. 8, 2021

(54) PRODUCT PLACEMENT SYSTEM AND METHOD

(71) Applicant: Contra Software, LLC, Lee's Summit, MO (US)

(72) Inventor: Christopher Lee Palmer, Lee's Summit, MO (US)

(73) Assignee: Contra Software, LLC, Lee's Summit, MO (US)

( * ) Notice: Subject to any disclaimer, the term of this patent is extended or adjusted under 35 U.S.C. 154(b) by 1236 days.

(21) Appl. No.: 14/476,470

(22) Filed: Sep. 3, 2014

(51) Int. Cl.
*G06Q 30/02* (2012.01)
*G06Q 50/18* (2012.01)

(52) U.S. Cl.
CPC ..... *G06Q 30/0273* (2013.01); *G06Q 30/0274* (2013.01); *G06Q 50/188* (2013.01)

(58) Field of Classification Search
CPC ............................ G06Q 30/0611; G06Q 10/00
See application file for complete search history.

(56) References Cited

U.S. PATENT DOCUMENTS

| 8,068,676 B2* | 11/2011 | Zhang | G06K 9/00362 382/111 |
| 8,112,314 B2* | 2/2012 | Patel | G06Q 20/12 705/26.41 |
| 2015/0213486 A1* | 7/2015 | Shenk | G06Q 30/0246 705/14.45 |
| 2015/0278894 A1* | 10/2015 | Reeder | G06Q 30/0611 705/80 |

OTHER PUBLICATIONS

Ebay (Year: 2011).*

* cited by examiner

*Primary Examiner* — Aryan E Weisenfeld
(74) *Attorney, Agent, or Firm* — Polsinelli PC

(57) ABSTRACT

A system includes one or more processors to receive a product placement opportunity for at least one clothing item from a studio client computing device and store information associated with the product placement opportunity in a memory, transmit the information associated with the product placement opportunity to at least one fashion client computing device, receive an acceptance of the product placement opportunity from a fashion client computing device and transmit information associated with the acceptance to the studio client computing device, and receive a payment from at least one of the studio client computing device and the fashion client computing device and hold the payment in escrow.

33 Claims, 32 Drawing Sheets

PRODUCT PLACEMENT SYSTEM AND METHOD

FIELD

The present systems and methods relate generally to a system and method for facilitating product placement in episodic, feature-length, and other entertainment production types across multiple media platforms. More particularly, a system and method provide a product placement marketplace for one or more studio client computing devices and one or more fashion client computing devices.

BACKGROUND

Newly introduced products, services, and apparel may benefit from the increased awareness by being featured in episodic, feature-length, and other entertainment productions including movies and television programs. As a result, brands seek exposure in movies and television programs. The entertainment industry benefits from product placements because they seek to add realism to productions by including products and services that are used by viewers or may be used by viewers.

Television studios and movie studios are continually in the process of locating and procuring products for current and future productions. As an example, these products may be worn by characters featured in the current and future productions and may be procured by members of staff associated with the current and future productions. The products may be associated with costumes of the characters. Oftentimes, the television studios, the movie studios, and other content creators require products services, or apparel for the current and future productions on a very tight timetable and on even tighter budgets.

Fashion designers and fashion retailers, including small boutiques and large department stores, are continually in the process of introducing new products or apparel and determining ways to best market their products, their brands, and their stores. Currently, when products or apparel are featured in entertainment productions, the fashion designers and retailers have no method to accurately determine the impact on sales or revenues due to the appearance of their products or apparel in the entertainment productions. The fashion designers and retailers may receive a return on their investment that exceeds traditional advertising or marketing. However, some fashion retailers are unable to dedicate resources toward advertising and marketing their current products and new products to the television and movie studios. In addition, the fashion retailers may not be able to easily quantify the value that they may receive by being featured in a movie or television program. Further, while being featured would be desirable, the fashion designers or retailers may not be able to easily determine future demand that could be associated with being featured in a movie or television program.

Most importantly, there is currently not a way that a fashion retailer may be assured that a viewer of a movie or television program in which its product appears will be able to easily or accurately determine that the product is associated with a particular fashion designer or fashion retailer. As a result, questions such as "What is the product?"; "Who makes the product?"; "Where can I purchase the product?"; and "How can I purchase the product?" are often unanswered or difficult to answer for a viewer. Because of this uncertainty, fashion designers or fashion retailers may refrain from pursuing opportunities to place products in entertainment content, may not know that a product is being used in entertainment content, and may not be able to adequately plan and prepare production runs for purposes of inventory for the demand that could be associated with being featured in a movie or a television program. The fashion designers or fashion retailers may run out of stock and be unable to meet the demand.

Currently, many television and movie studios and fashion retailers utilize third party product placement agencies for lifestyle products. These third party product placement agencies may include marketing and advertising firms that assist with the difficult tasks associated with product placement. These third parties do not necessarily have experience and know-how to handle product placements for fashion products. If the third parties do have experience, services may be very costly and often not available to fashion designers looking to place products in the entertainment industry. Currently, product placements for fashion products are not common in the apparel industry because there is not an easy to use, mutually beneficial process. It is desirable to provide a system that benefits both studios and merchants while simplifying product placements for fashion products. In addition, it is desirable to provide information that quantifies the value of product placement for both studios and retailers.

SUMMARY

Briefly described, and according to one embodiment, aspects of the present disclosure generally relate to methods and systems for product placement. In one aspect, a system provides a product placement marketplace for one or more studio client computing devices and one or more fashion client computing devices. The system includes a server computing device for receiving one or more requests from the one or more studio client computing devices and the one or more fashion client computing devices and responding to the one or more requests. The requests and responses may be associated with one or more product placement opportunities.

According to one embodiment, a system includes one or more processors to receive a product placement opportunity for at least one clothing item from a studio client computing device and store information associated with the product placement opportunity in a memory, transmit the information associated with the product placement opportunity to at least one fashion client computing device, receive an acceptance of the product placement opportunity from a fashion client computing device and transmit information associated with the acceptance to the studio client computing device, and receive a payment from at least one of the studio client computing device and the fashion client computing device and hold the payment in escrow.

According to a further embodiment, a method includes receiving, by at least one processor, a product placement opportunity for at least one clothing item from a studio client computing device and storing information associated with the product placement opportunity in a memory, transmitting, by the at least one processor, the information associated with the product placement opportunity to at least one fashion client computing device, receiving, by the at least one processor, an acceptance of the product placement opportunity from a fashion client computing device and transmitting information associated with the acceptance to the studio client computing device, and receiving, by the at least one processor, a payment from at least one of the studio client computing device and the fashion client computing device and holding the payment in escrow.

According to another embodiment, a non-transitory computer-readable medium includes instructions stored thereon that, when executed by one or more processors, cause the one or more processors to perform operations including receiving a product placement opportunity for at least one clothing item from a studio client computing device and storing information associated with the product placement opportunity in a memory, transmitting the information associated with the product placement opportunity to at least one fashion client computing device, receiving an acceptance of the product placement opportunity from a fashion client computing device and transmitting information associated with the acceptance to the studio client computing device, and receiving a payment from at least one of the studio client computing device and the fashion client computing device and holding the payment in escrow.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
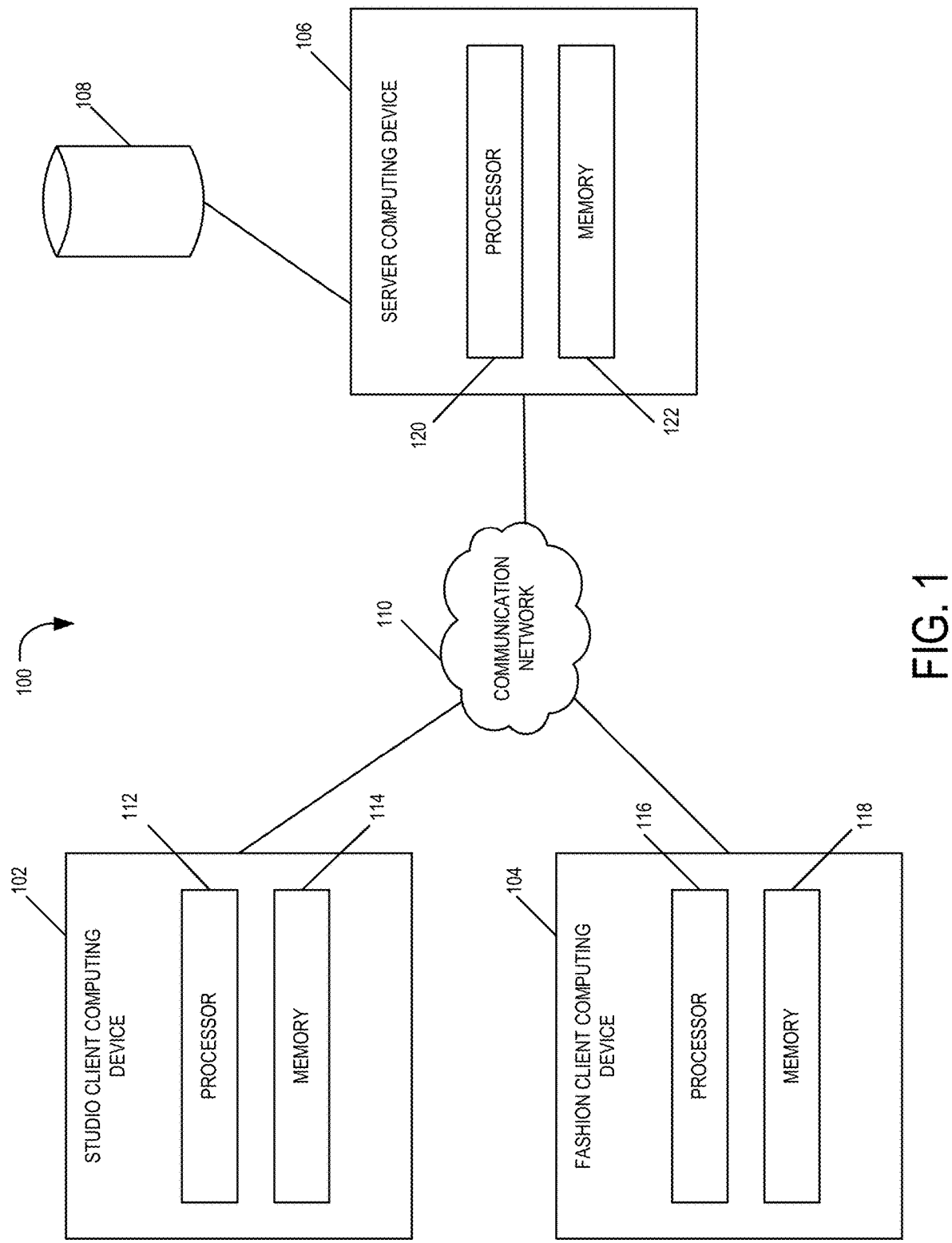
FIG. 1 illustrates a block diagram of a product placement system according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Product placement involves the practice of intentionally placing a specific brand or product as part of a character costume into entertainment including television shows, movies, books, video games, and other forms of entertainment. Usually, product placements are a result of an agreement or exchange between retailers and the entertainment industry. These agreements may be designed to be beneficial to both parties.

As an example, a product usage placement may occur when an on-screen personality refers to or handles the product, service, or corporation. A usage placement may involve a visual and/or spoken element. In particular, if the product is a clothing item, the on-screen personality may wear the product.

In the 1980s, the practice of product placement evolved into an industry. Since the 1980s, production studios have opened departments that are dedicated to product placement. Both production studios and brands recognize product placement as a viable marketing strategy that on its own may drive sales and/or may be coupled with a traditional marketing strategy.

As an example, Reese's Pieces were introduced in 1978. In 1982, Reese's Pieces became popular following the release of the movie E.T., the Extra Terrestrial, in which the candy is featured. In HBO's Band of Brothers, vehicles used on-screen were provided by JEEP®, who helped fund the production. In American Idol, beverage cups showing a COCA-COLA® logo are placed in front of the three judges. These are examples of successful lifestyle product placements.

Feature films and television programs may reach millions of consumers and have a long life after initially running in theaters and on television. While an ad placed in a newspaper may have limited exposure that may last a few days, a product featured in a movie may be featured for decades. A fashion designer or a fashion retailer may have no accurate method of linking sales directly to the paid newspaper advertisement. Additionally, it may be very expensive or even impossible to have a celebrity endorse a product in a traditional advertisement. However, the celebrity may wear a particular brand or product on-screen in a movie or television episode, in effect creating a de-facto celebrity endorsement.

When an actor on a television show wears a brand of clothing, the brand may enter homes of millions of viewers. In addition, brands worn by the actor may be highlighted on websites and social media even after the television show airs.

Conventionally, the rare product placement agreement that is consummated is setup individually by entertainment studios that reach out to retailers. Retailers also may initiate cold calls or cold emails to the studios with a photograph or link of a product. However, there is no current method for a fashion designer or a fashion retailer to measure its return on investment for placement deals. In addition, there is no method for accurately measuring sales directly attributable to a placement deal or for a product appearing on screen in entertainment content. Similarly, there is no method for a viewer of content to accurately determine what products are being worn in entertainment content, where to purchase the products, and how to purchase the products.

A publicist or a brand may have to personally do the legwork to contact costume departments and invite costume designers to press previews or showroom visits or even send samples of products. This is an inefficient and expensive method of entering the product placement agreements. In addition, many up-and-coming designers may not be able to easily convince costume departments that their products are suitable for product placement.

Some brands may desire an opportunity to initiate product placement negotiations and bid on potential product placement opportunities. This is currently not a viable option for fashion designers or fashion retailers. A large percentage of designers or retailers may not even know that their products are being worn in entertainment productions. Through a product placement marketplace, costume expenditures may be reduced for costume designers of entertainment productions through free products. In the case of paid placements, productions already operating on very tight budgets may be able to generate a portion of the costume budget. In addition, through the product placement marketplace, fashion designers or fashion retailers may be able to more easily quantify the return on their investments on paid and free product placements. The fashion designers or the fashion retailers may be able to link sales trends for products appearing in entertainment content that are purchased from the placement marketplace. Fashion designers or fashion retailers may be able to track what products are being worn on-screen, which characters and actors are wearing the products, and determine how these events may influence sales.

One or more client computing devices may communicate with a server computing device using a communications network. The server computing device may provide resources associated with a product placement marketplace. The client computing devices may display a web-based user interface associated with the product placement marketplace to allow a user to enter into product placement opportunities.

The client computing device and the server computing device communicate using Hypertext Transfer Protocol (HTTP) and/or other communications protocols. HTTP provides a request-response protocol in the client-server computing model. A web browser running on the client computing device may be a client and an application running on the server computing device may be the server, e.g., a web server. The client submits an HTTP request to the server. The web server of the server computing device provides resources including Hypertext Markup Language (HTML) files and other content, and performs other functions on behalf of the client, and returns a response message to the client.

As an example, the server computing device receives the HTTP request from the client computing device to initiate a product placement opportunity, negotiate terms associated with the product placement opportunity via counteroffers, or agree/reject the product placement opportunity. The server computing device may return a response message to the web browser running on the client computing device or application that may visually indicate a current status of the product placement opportunity and information associated with the product placement opportunity.

FIG. 1 illustrates a block diagram of a product placement (PP) system 100 according to an example embodiment. According to an aspect of the present disclosure, the PP system 100 includes one or more studio client computing devices 102. The PP system 100 further comprises one or more fashion client computing devices 104 and one or more server computing devices 106. One or more studio users may use the studio client computing devices 102. One or more fashion users may use the fashion client computing devices 104. The PP system 100 further comprises one or more product placement databases 108. The one or more computing devices communicate and coordinate their actions by passing messages over the communication network 110. The communication network 110 can be one or more of the Internet, an intranet, a cellular communications network, a WiFi network, a packet network, or another wired or wireless communication network. As an example, the one or more computing devices communicate data in packets, messages, or other communications using a common protocol, e.g., Hypertext Transfer Protocol (HTTP) and/or Hypertext Transfer Protocol Secure (HTTPS). As an example, the PP system 100 may be a cloud-based computer system or a distributed computer system.

The one or more product placement databases 108 each comprise an organized collection of data. The data in the product placement databases 108 may include one or more tables comprising product placement information. The product placement information may include account information (e.g., studio account information, fashion account information), and product placement opportunity information. The product placement opportunity information may include product placement unique identifier information (e.g., 12345678), product placement user account information (e.g., a first studio account and a second fashion retailer account), product information (e.g., a large red shirt by designer ABC having SKU 123456 or a size small black skirt by designer DEF having SKU 654321), project information (e.g., episodic information, feature-length information, etc.), and statistical information (e.g., graphical and/or textual product placement information for a studio for a previous month including total payments organized by amount), among other information. As an example, the product placement unique identifier information may be stored in a first table, the product placement user account information may be stored in a second table, the product information may be stored in a third table, the project information may be stored in a fourth table, and the statistical information may be stored in a fifth table.

The information may be stored in a non-relational database and/or in a relational database. As an example, the information may be stored in one or more files comprising one or more tables (e.g., a spreadsheet), a relational database management system (RDBMS), an open source distributed database management system such as a Not only SQL (NoSQL) database management system, an in-memory database (IMDB) management system, or another appropriate database management system.

Figure 2:
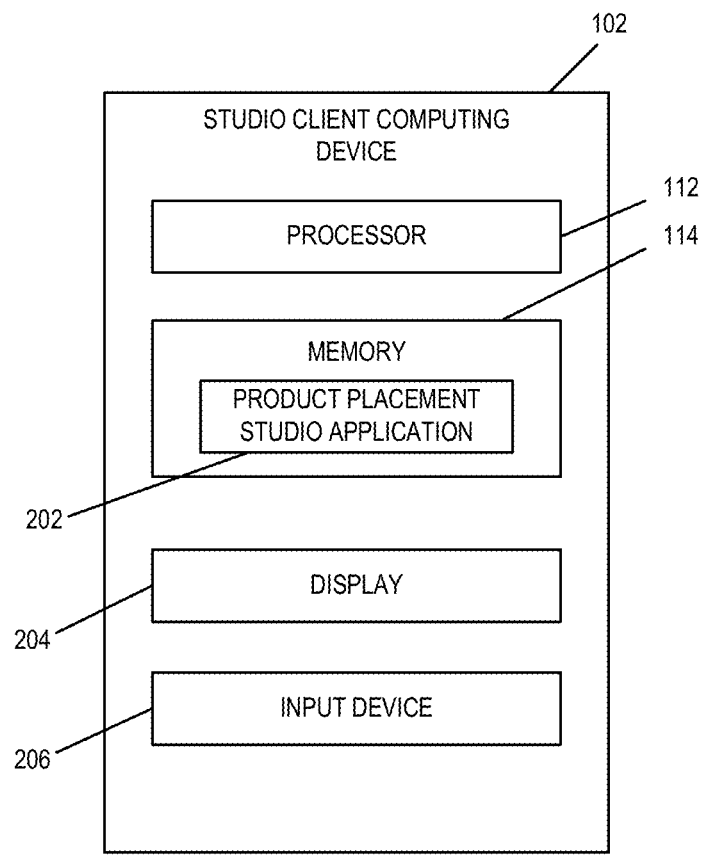
FIG. 2 illustrates a block diagram of studio client computing device of the product placement system according to an example embodiment.

FIGS. 1 and 2 illustrate a block diagram of the studio client computing device 102 according to an example embodiment. The studio client computing device 102 may be a computer having a processor 112 and memory 114, including but not limited to a laptop, desktop, tablet computer, mobile computing device (e.g., a smartphone) or a dedicated electronic device having a processor and memory. The one or more processors 112 may process machine/ computer-readable executable instructions and data, and the memory 114 may store machine/computer-readable executable instructions and data including one or more applications, including a product placement studio application 202. The processor 112 and memory 114 are hardware. The memory 114 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like. Additionally, the memory 114 may also include a dedicated file server having one or more dedicated processors, random access memory (RAM), a Redundant Array of Inexpensive/Independent Disks (RAID) hard drive configuration, and an Ethernet interface or other communication interface, among other components.

The studio client computing device 102 executes the product placement studio application 202 to create product placement opportunities, respond to product placement opportunities, create counteroffers for product placement opportunities, accept/reject counteroffers associated with product placement opportunities, accept product placement opportunities, reject product placement opportunities, associate products with at least one of projects, seasons, episodes, scenes, characters, and costumes, and review statistics associated with product placement opportunities, among others. The product placement studio application 202 may be a native application executed by the studio client computing device 102 and/or a web-based application viewed using a web browser.

In order to obtain access to protected resources associated with the server computing device 106, e.g., resources stored in the database 108, the studio client computing device 102 may transmit a request including a representation of a username and a password to the server computing device 106 using lightweight directory access protocol (LDAP), HTTP, hypertext transport protocol secure (HTTPS) and/or other protocols. The request may be a LDAP request, a representational state transfer (REST) request, a Simple Object Access Protocol (SOAP) request, or another type of request. The server computing device 106 verifies the username and password and transmits a response to the studio client computing device 102. The server computing device 106 may transmit an HTTP response, an HTTPS response, a LDAP response, a REST response, a SOAP response, and/or another type of response.

The username and password may be encrypted by the studio client computing device 102 using secure sockets layer (SSL) and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the server computing device 106 without directly sending the username and password to the server computing device via the communications network 110. The output of the cryptographic hash function is a binary string that may be encoded using Base64.

The product placement studio application 202 and the web browser may be a component of an application and/or service executable by the studio client computing device 102. For example, the product placement studio application 202 may be a single unit of deployable executable code. The web browser may be one application and/or a suite of applications. As an example, the web browser may be INTERNET EXPLORER®, SAFARI®, CHROME™, FIREFOX™, OPERA™, and other applications. The web browser may be part of another native application executed by the studio client computing device 102 (e.g., a web view within the native application) and/or the web browser may be a mobile web browser. According to an example embodiment, the web view may be embedded in a mobile application (e.g., an app) downloaded from a digital distribution application platform that allows users to browse and download applications developed with mobile software development kits (SDKs) including the App Store and GOOGLE PLAY® among others. The app may be installed on the studio client computing device 102, which may have the iOS operating system or an ANDROID™ operating system, among other operating systems. The product placement studio application 202 communicates messages to the server computing device 106 and receives messages from the server computing device, e.g., HTTP requests and corresponding HTTP responses. The responses may comprise requested content associated with the product placement studio application 202.

The studio client computing device 102 further includes a display 204 and an input device 206. The display 204 is used to display visual components of the product placement studio application 202, such as at a user interface. In one example, the user interface may display a user interface of the studio product placement application 202, and a representation of the requested resources received from the server computing device 106. The display 204 can include a cathode-ray tube display, a liquid-crystal display, a light-emitting diode display, a touch screen display, and other displays. The input device 206 is used to interact with the product placement studio application 202 and/or the web browser and may include a mouse, a keyboard, a trackpad, and/or the like. The input device 206 may be included within the display 204 if the display is a touch screen display. The input device 206 allows a user of the studio client computing device 102 to manipulate the user interface of the product placement studio application 202.

Additionally, the studio client computing device 102 may include an optional sound device for providing audio output that may be associated with a notification provided by the product placement studio application 202 and an optional vibration motor for providing vibration feedback that may be associated with a notification provided by the product placement studio application 202. The studio client computing device 102 may include an optional camera device for taking photographs of products and/or actors wearing products and scanning bar codes on products.

Figure 3:
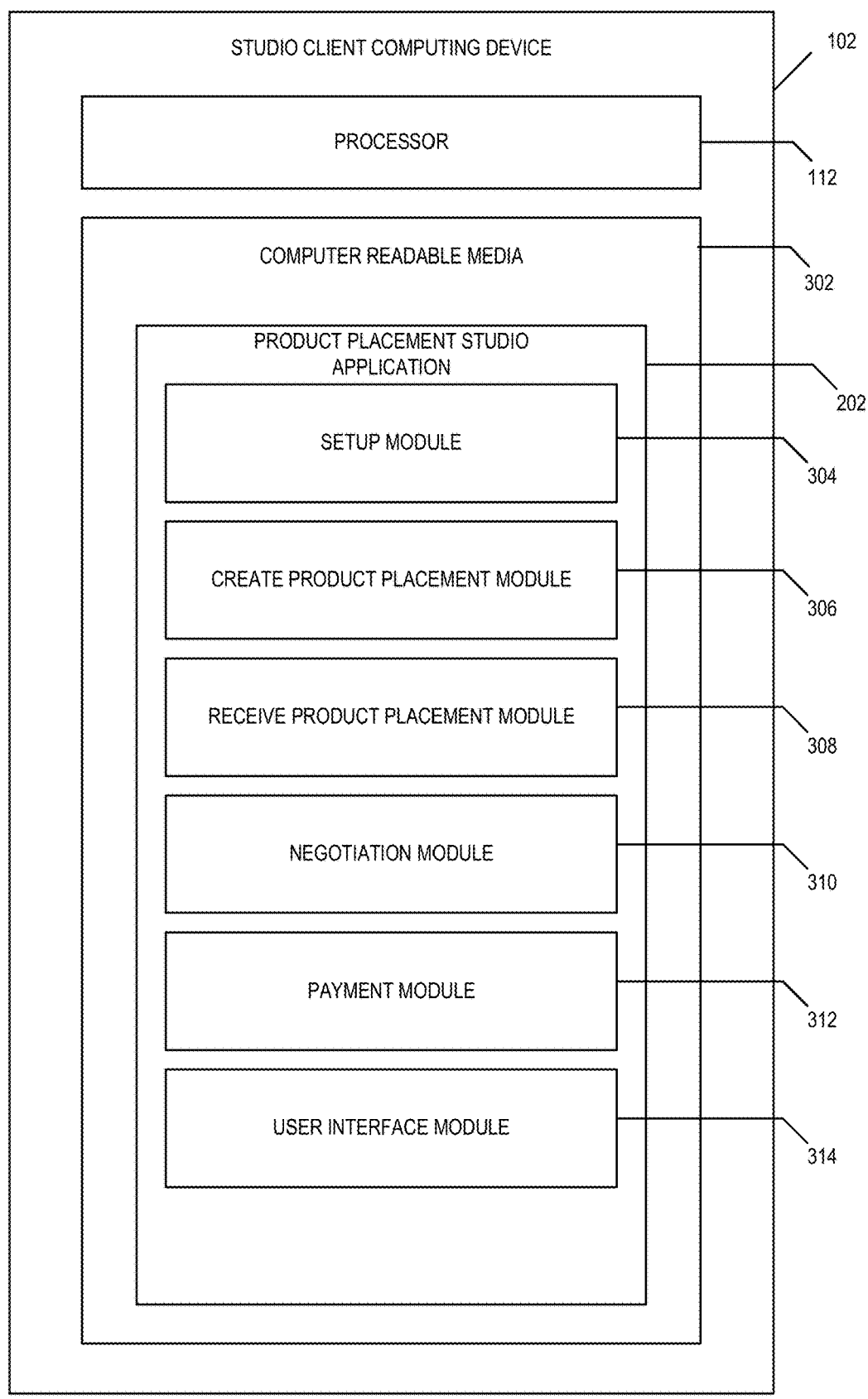
FIG. 3 illustrates a block diagram of a product placement studio application of the studio client computing device according to an example embodiment.

FIG. 3 illustrates a block diagram of the product placement studio application 202 of the studio client computing device 102 according to an example embodiment. The studio client computing device 102 includes computer readable media (CRM) 302 on which the product placement studio application 202 is stored. The computer readable media 302 may include volatile media, nonvolatile media, removable media, non-removable media, and/or another available medium that can be accessed by the processor 112. By way of example and not limitation, the computer readable media 302 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

The product placement studio application 202 includes a setup module 304 for setting up a studio account for use with the product placement system 100 and the server computing device 106. According to an example embodiment, the setup module 304 provides an interface and/or a menu for creating an account for use with the product placement system 100 and editing information associated with the account for use with the product placement system 100. The setup module 304 transmits the information associated with the account to the server computing device 106 and/or the database 108. As an example, when creating an account for use with the product placement system 100, the setup module 304 may request username and password information (e.g., username: BigMovieStudio123, password: secretpassword), name information associated with the account (e.g., costume designer and staff names), address information associated with the account (e.g., 1000 Hollywood Road, Los Angeles, Calif.), payment information associated with the account (e.g., (1) a bank account number and a routing number or (2) a credit card number, expiration date, card verification value/card security code), contact information (e.g., one or more email addresses, one or more telephone numbers, one or more social network usernames/passwords), and project information. The project information may include information about episodic projects (e.g., television shows or episodic streaming media) and feature length projects (e.g., movies including streaming media). The project information may comprise season information, episode information, scene information, character information, schedule information, budget information, staff information, reports information, continuity information, placement information, and inspiration board information, among other information. The episode information may include one or more scenes including scene information.

The scene information may include one or more characters associated with the scene and one or more costumes for each of the one or more characters associated with the scene. Each scene may include a scene number, a title, a script day, a shoot day, one or more principal characters having one or more costume pieces, one or more optional background characters having one or more costume pieces, one or more optional stunt characters having one or more costume pieces, and one or more optional featured extras having one or more costume pieces, among other information. The costume pieces may include costume information, description information, and one or more photographs. As an example, costume pieces for a particular character in a particular scene may include a shirt, denim pants, a jacket, and boots. The costume information may include costume piece information, notes information, comments information, information regarding other scenes in which the costume appears, and continuity information, among other information. The description information may include a fashion retailer name, a brand name, a product name, one or more colors, one or more sizes, and a price, among other information. The one or more photographs may be continuity photographs, catalog photographs, fitting photographs, or another type of photographs. In addition, the scene may include script continuity information. As an example, the setup module 304 provides a native interface and/or web-based user interface for use by users of the one or more studio client computers 102.

The product placement studio application 202 further includes a create product placement module 306 for creating a product placement opportunity for one or more fashion users. The create product placement module 306 receives input information from a studio user associated with a product. As an example, the input information may include information associated with a costume piece including a fashion retailer name, a brand name, and a product name, among other information. The studio user may select the costume piece from a marketplace of other available costume pieces in the product placement system 100, from a list of favorite costume pieces, by scanning a barcode with the optional camera device of the studio client computing device 102, or by manually entering information associated with the costume piece.

The studio user selects a type of product placement opportunity including one of a paid placement, a promotional placement (also known as in-kind), a pull placement, and a purchase placement, among other types of placements. In a paid placement, the fashion user agrees to pay a certain amount of money and provide a product to a studio in exchange for the studio user agreeing to place the product on an on-screen character. In a promotional placement, the fashion user provides a product to a studio for zero cost in exchange for the studio agreeing to place the product on an on-screen character. In a pull placement, the studio user selects one or more products from a fashion user in the marketplace for potential use on an on-screen character. The studio user agrees in advance to purchase what is used and return all unused products, paying only a restocking fee for the returned products. In a purchase placement, the studio user buys the product from a fashion user in the marketplace. The fashion user may agree to a reduced price for a product in exchange for the studio user's agreement to place the product on an on-screen character.

The create product placement module 306 may receive a quantity of costume pieces requested, a size or sizes of the product, a project name, a scene name, a character name, a costume of the character, and a price of the product placement, among other information. The product placement opportunity may be associated with the project, season, episode, scene, character, and the costume of the character. The create product placement module 306 also may receive information associated with a need-by date.

Once the create product placement module 306 receives the selection of the costume piece, and the type of product placement opportunity, the create product placement module 306 transmits information associated with the product placement opportunity to the server computing device 106. The server computing device 106 receives the information associated with the product placement opportunity and stores the information associated with the product placement opportunity in the database 108, and in other locations.

The product placement studio application 202 further includes a receive product placement module 308 for receiving a product placement opportunity from the one or more fashion users. The receive product placement module 308 may receive information associated with one or more pending product placement requests, one or more denied product placement requests, one or more countered offers, and one or more product placement agreements. The user may view information associated with each of the one or more pending product placement requests, each of the one or more denied product placement requests, each of the one or more countered offers, and each of the one or more product placement agreements.

The product placement studio application 202 further includes a negotiation module 310 for rejecting or accepting product placement opportunities and creating, viewing, accepting, or rejecting counteroffers associated with product placement opportunities, a payment module 312 for receiving payment from the studio client computing device 102 associated with the one or more product placement opportunities, and a user interface module 314.

The user interface module 314 receives responses from the one or more server computing devices 106 and provides a representation of requested information and user interface elements to the studio client computing device 102 for display on the display 204. As an example, the user interface module 314 generates a native and/or web-based graphical user interface (GUI) that accepts input and provides output by incorporating received web content that is transmitted via the communication network 110 and viewed by a user of the studio client computing device 102. The user interface module 314 may provide realtime automatically and dynamically refreshed information to the user of the studio client computing device 102 using Java, Javascript, AJAX (Asynchronous Javascript and XML), Microsoft .NET, and/or node.js, among others. The user interface module 314 may send data to the server computing device 106, and retrieve data from the server computing device 106 asynchronously without interfering with the display and behavior of the web page displayed on the studio client computing device 102. As an example, data may be retrieved using XMLHttpRequest objects.

Figure 4:
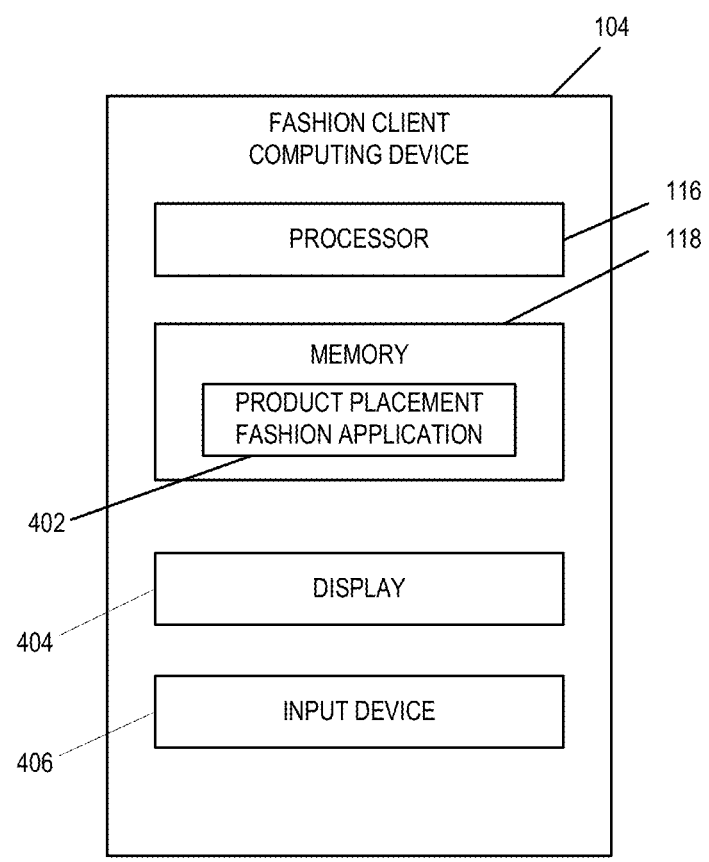
FIG. 4 illustrates a block diagram of a fashion client computing device of the product placement system according to an example embodiment.

FIGS. 1 and 4 illustrate a block diagram of the fashion client computing device 104 according to an example embodiment. The fashion client computing device 104 may be a computer having a processor 116 and memory 118, including but not limited to a laptop, desktop, tablet computer, mobile computing device (e.g., a smartphone) or a dedicated electronic device having a processor and memory. The one or more processors 116 may process machine/computer-readable executable instructions and data, and the memory 118 may store machine/computer-readable executable instructions and data including one or more applications, including a product placement fashion application 402. The processor 116 and memory 118 are hardware. The memory 118 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like. Additionally, the memory 114 may also include a dedicated file server having one or more dedicated processors, random access memory (RAM), a Redundant Array of Inexpensive/Independent Disks (RAID) hard drive configuration, and an Ethernet interface or other communication interface, among other components.

The fashion client computing device 104 executes the product placement fashion application 402 to create product placement opportunities, respond to product placement opportunities, create counteroffers for product placement opportunities, accept or reject counteroffers associated with product placement opportunities, accept product placement opportunities, and review statistics associated with product placement opportunities, among others. The product placement fashion application 402 may be a native application executed by the fashion client computing device 104 and/or a web-based application viewed using a web browser.

In order to obtain access to protected resources associated with the server computing device 106, e.g., resources stored in the database 108, the fashion client computing device 104 may transmit a request including a representation of a username and a password to the server computing device 106 using lightweight directory access protocol (LDAP), HTTP, hypertext transport protocol secure (HTTPS) and/or other protocols. The request may be an LDAP request, a representational state transfer (REST) request, a Simple Object Access Protocol (SOAP) request, or another type of request. The server computing device 106 verifies the username and password and in response transmits a response to the fashion client computing device 104. The server computing device 106 may transmit an HTTP response, an HTTPS response, a LDAP response, a REST response, a SOAP response, and/or another type of response.

The username and password may be encrypted by the fashion client computing device 104 using secure sockets layer (SSL) and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the server computing device 106 without directly sending the username and password to the server computing device via the communications network 110. The output of the cryptographic hash function is a binary string that may be encoded using Base64.

The product placement fashion application 402 and the web browser may be a component of an application and/or service executable by the fashion client computing device 104. For example, the product placement fashion application 402 may be a single unit of deployable executable code. The web browser may be one application and/or a suite of applications. As an example, the web browser may be INTERNET EXPLORER®, SAFARI®, CHROME™, FIREFOX®, OPERA™, and other applications. The web browser may be part of another native application executed by the fashion client computing device 104 (e.g., a web view within the native application) and/or the web browser may be a mobile web browser. According to an example embodiment, the web view may be embedded in a mobile application (e.g., an app) downloaded from a digital distribution application platform that allows users to browse and download applications developed with mobile software development kits (SDKs) including the App Store and GOOGLE PLAY® among others. The app may be installed on the fashion client computing device 104, which may have the iOS operating system or an ANDROID™ operating system, among other operating systems. The product placement fashion application 402 communicates messages to the server computing device 106 and receives messages from the server computing device, e.g., HTTP requests and corresponding HTTP responses. The responses may comprise requested content associated with the product placement fashion application 402.

The fashion client computing device 104 further includes a display 404 and an input device 406. The display 404 is used to display visual components of the product placement fashion application 402, such as at a user interface. In one example, the user interface may display a user interface of the fashion product placement application 402, and a representation of the requested resources received from the server computing device 106. The display 404 can include a cathode-ray tube display, a liquid-crystal display, a light-emitting diode display, a touch screen display, and other displays. The input device 406 is used to interact with the product placement fashion application 402 and/or the web browser and may include a mouse, a keyboard, a trackpad, and/or the like. The input device 406 may be included within the display 404 if the display is a touch screen display. The input device 406 allows a user of the fashion client computing device 104 to manipulate the user interface of the product placement fashion application 402.

Additionally, the fashion client computing device 104 may include an optional sound device for providing audio output that may be associated with a notification provided by the product placement fashion application 402 and an optional vibration motor for providing vibration feedback that may be associated with a notification provided by the product placement fashion application 402. The fashion client computing device 104 may include an optional camera device for taking photographs of products and/or models wearing products and scanning bar codes on products.

Figure 5:
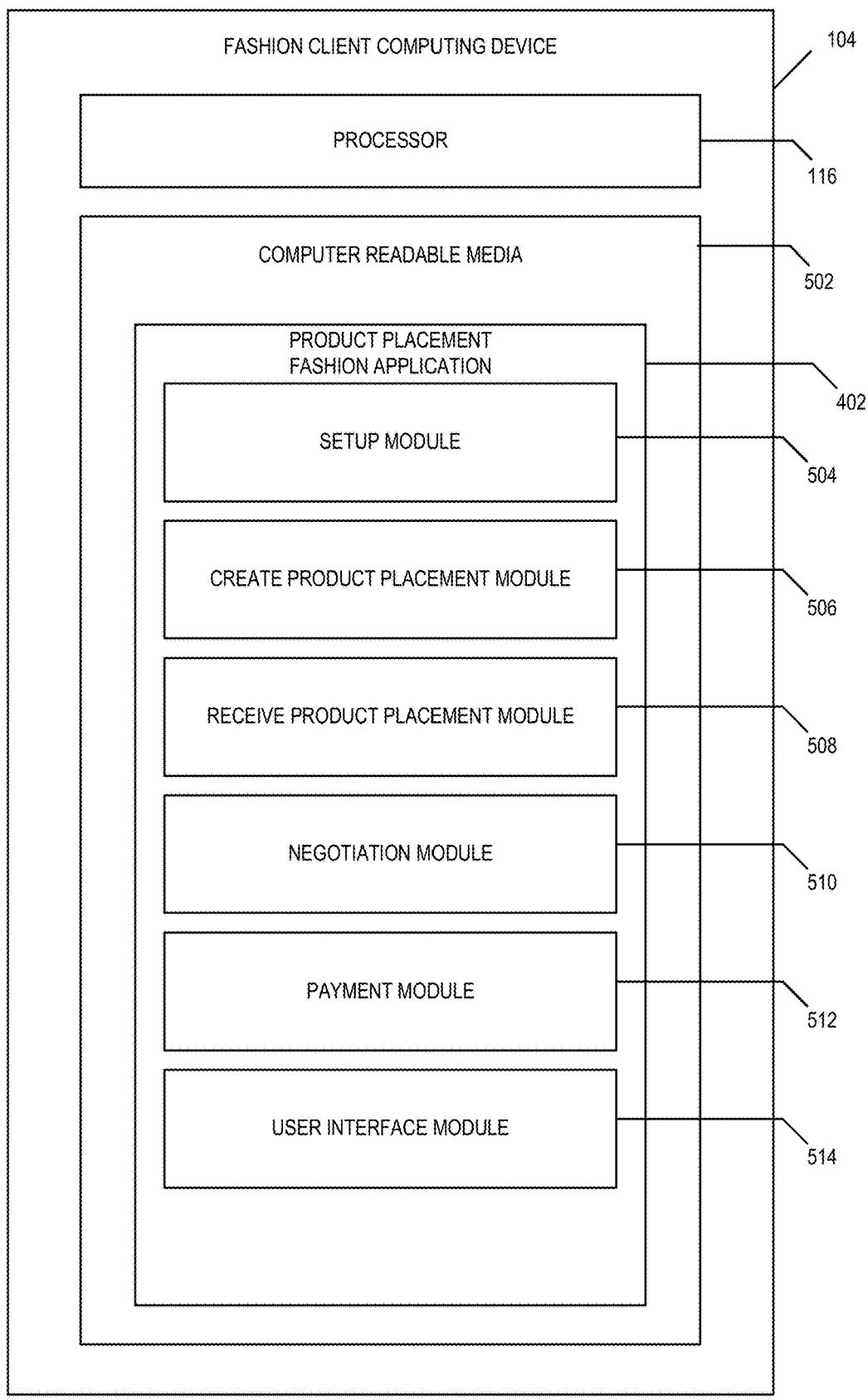
FIG. 5 illustrates a block diagram of a product placement fashion application of the fashion client computing device according to an example embodiment.

FIG. 5 illustrates a block diagram of the product placement fashion application 402 of the fashion client computing device 104 according to an example embodiment. The fashion client computing device 104 includes computer readable media (CRM) 502 on which the product placement fashion application 402 is stored. The computer readable media 502 may include volatile media, nonvolatile media, removable media, non-removable media, and/or another available medium that can be accessed by the processor 116. By way of example and not limitation, the computer readable media 502 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

The product placement fashion application 402 includes a setup module 504 for setting up a fashion account for use with the product placement system 100 and the server computing device 106. According to an example embodiment, the setup module 504 provides an interface and/or a menu for creating an account for use with the product placement system 100 and editing information associated with the account for use with the product placement system 100. The setup module 504 transmits the information associated with the account to the server computing device 106 and/or the database 108. As an example, when creating an account for use with the product placement system 100, the setup module 504 may request username and password information (e.g., username: FashionUser, password: Secret), name information (e.g., fashion retailer staff names), address information (e.g., 100 Fifth Ave. New York, N.Y.), payment information (e.g., (1) a bank account number and a routing number or (2) a credit card number, expiration date, card verification value/card security code), contact information (e.g., one or more email addresses, one or more telephone numbers, one or more social network usernames/passwords), and clothing information, among other information. The clothing information may include information associated with one or more pieces of clothing or accessories including gender information (e.g., a piece of clothing is men's apparel or a piece of clothing is women's apparel), shirt information, pants information, top information, dress information, shoe information, hat information, belt information, jewelry information, and other information. As an example, the setup module 504 provides a native interface and/or web-based user interface for use by users of the one or more fashion client computers 104.

The product placement fashion application 402 further includes a create product placement module 506 for creating a product placement opportunity for one or more studio users. The create product placement module 506 receives input information from a fashion user associated with a product. As an example, the input information may include information associated with a costume piece including a fashion designer or a retailer name, a brand name, a product name, a stock keeping unit (SKU), a color or pattern information, available sizes, a short description of the product, detailed information regarding the product, season or collection of the product (e.g., Fall/Winter 2015), availability date information, designer information, product category information, quantity information, inventory information, and product sample information, among other information. The fashion user may select the costume piece from a marketplace of other available costume pieces in the product placement system 100 already added by the fashion user, from a list of favorite costume pieces for the fashion user, by scanning a barcode with the optional camera device of the fashion client computing device 104, and by manually entering information associated with the costume piece.

The fashion user selects a type of product placement opportunity including one of a paid placement, a promotional placement (also known as in-kind), a pull placement, and a purchase placement, among other types of placements. In a paid placement, the fashion user agrees to pay a certain amount of money and provide a product to a studio in exchange for the studio user agreeing to place the product on an on-screen character. In a promotional placement, the fashion user provides a product to a studio for zero cost in exchange for the studio agreeing to place the product on an on-screen character. In a pull placement, the studio user selects one or more products from a fashion user in the marketplace for potential use on an on-screen character. The studio user agrees in advance to purchase what is used and return all unused products, paying only a restocking fee for the returned products. In a purchase placement, the studio user buys the product from a fashion user in the marketplace. The fashion user may agree to a reduced price for a product in exchange for the studio user's agreement to place the product on an on-screen character.

Once the create product placement module 506 receives the selection of the costume piece with the description of the costume piece and the type of product placement opportunity, the create product placement module 506 transmits information associated with the product placement opportunity to the server computing device 106. The server computing device 106 receives the information associated with the product placement opportunity and stores the information associated with the product placement opportunity in the database 108, and/or in other locations.

The product placement fashion application 402 further includes a receive product placement module 508 for receiving a product placement opportunity from the one or more studio users. The receive product placement module 508 may receive information associated with one or more pending product placement requests, one or more denied product placement requests, one or more countered offers, and one or more product placement agreements. The user may view information associated with each of the one or more pending product placement requests, each of the one or more denied product placement requests, each of the one or more countered offers, and each of the one or more product placement agreements.

The product placement fashion application 402 further includes a negotiation module 510 for rejecting or accepting product placement opportunities and creating, viewing, accepting, or rejecting counteroffers associated with product placement opportunities, a payment module 512 for receiving payment from the fashion client computing device 104 associated with the one or more product placement opportunities, and a user interface module 514.

The user interface module 514 receives responses from the one or more server computing devices 106 and provides a representation of requested information and user interface elements to the fashion client computing device 104 for display on the display 404. As an example, the user interface module 514 generates a native and/or web-based graphical user interface (GUI) that accepts input and provides output by incorporating received web content that is transmitted via the communication network 110 and viewed by a user of the fashion client computing device 104. The user interface module 514 may provide realtime automatically and dynamically refreshed information to the user of the fashion client computing device 104 using Java, Javascript, AJAX (Asynchronous Javascript and XML), Microsoft .NET, and/or node.js, among others. The user interface module 514 may send data to the server computing device 106, and retrieve data from the server computing device 106 asynchronously without interfering with the display and behavior of the web page displayed on the fashion client computing device 104. As an example, data may be retrieved using XMLHttpRequest objects.

Figure 6:
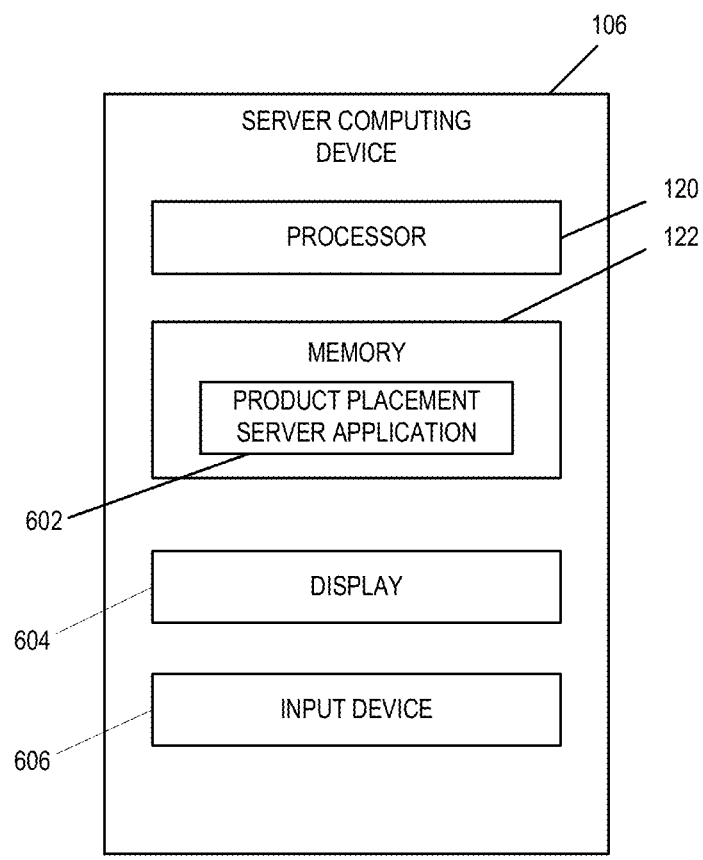
FIG. 6 illustrates a block diagram of a server computing device of the product placement system according to an example embodiment.

FIGS. 1 and 6 illustrate a block diagram of the server computing device 106 according to an example embodiment. The server computing device 106 may be a computer having a processor 120 and memory 122, including but not limited to a server, laptop, desktop, tablet computer, mobile computing device (e.g., a smartphone) or a dedicated electronic device having a processor and memory. The one or more processors 120 may process machine/computer-readable executable instructions and data, and the memory 122 may store machine/computer-readable executable instructions and data including one or more applications, including a product placement server application 602. The processor 120 and memory 122 are hardware. The memory 122 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like. Additionally, the memory 122 may also include a dedicated file server having one or more dedicated processors, random access memory (RAM), a Redundant Array of Inexpensive/Independent Disks (RAID) hard drive configuration, and an Ethernet interface or other communication interface, among other components.

In one aspect, the product placement server application 602 comprises a web server for responding to requests from the one or more studio client computing devices 102 and the one or more fashion client computing devices 104. As an example, the product placement server application 602 may receive a request to create a new product placement opportunity from a studio client computing device 102 or a fashion client computing device 104. In response to receiving this request to create the new product placement opportunity, the product placement server application 602 may send a message to one or more studio client computing devices 102 and/or one or more fashion client computing devices 104 to inform users of the new product placement opportunity.

The server computing device 106 may further include an optional display 604 and an optional input device 606. The display 604 is used to display visual components of the product placement server application 602, such as at a user interface, if applicable. In one example, the user interface may display user information of the product placement server application 602, and a representation of one or more current product placement opportunities associated with the product placement system 100. The display 604 also may display statistical or analytical information associated with current and past product placement opportunities. The display 604 can include a cathode-ray tube display, liquid crystal display, a light-emitting diode display, a touch screen display, and other displays. The input device 606 is used to interact with the product placement server application 602 and may include a mouse, a keyboard, a trackpad, and/or the like. The input device 606 may be included within the display 604 if the display is a touch screen display. The input device 606 allows a user of the server computing device 106 to manipulate the user interface of the product placement server application 602.

Figure 7:
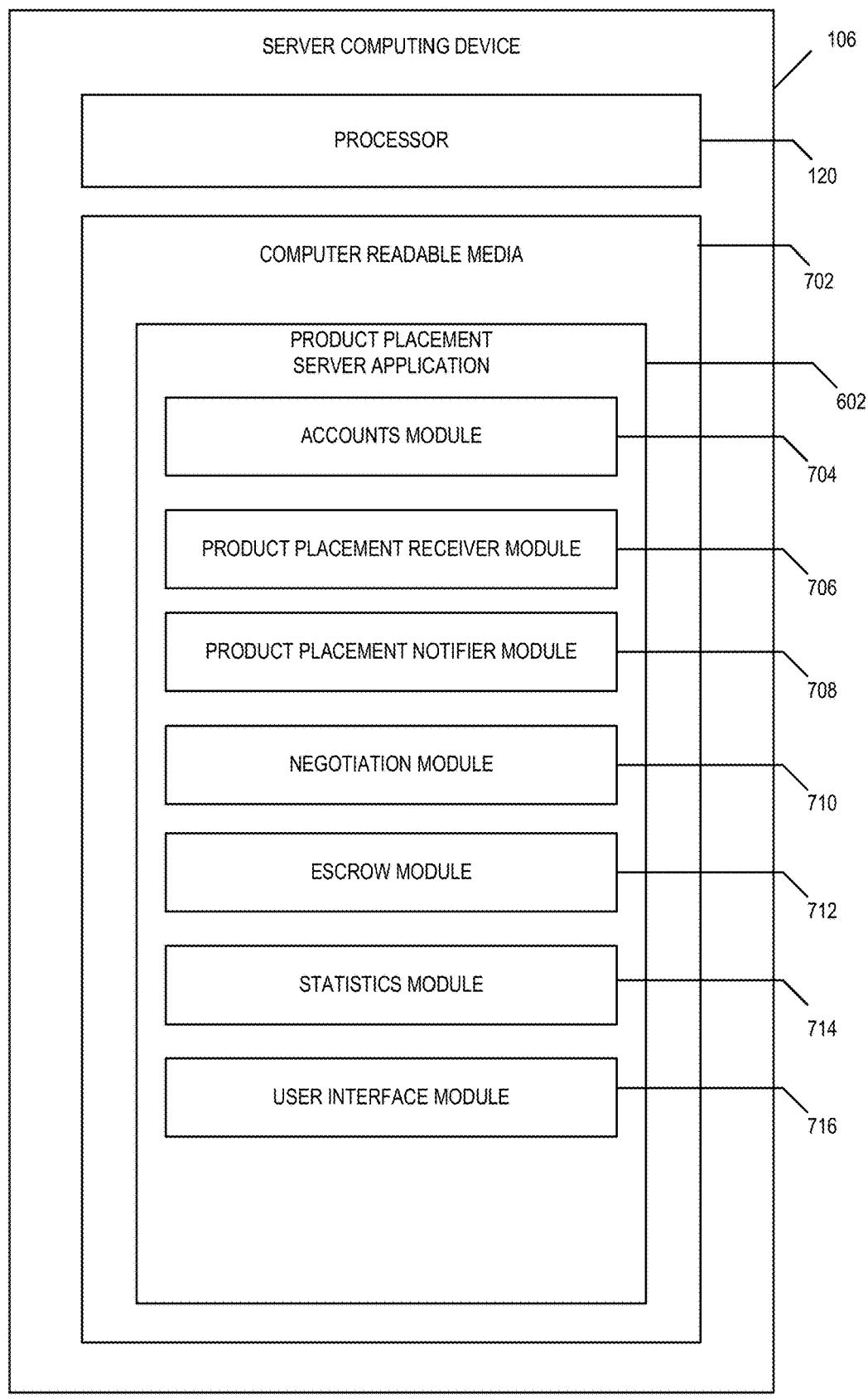
FIG. 7 illustrates a block diagram of a product placement server application of the server computing device according to an example embodiment.

FIG. 7 illustrates a block diagram of the product placement server application 602 of the server computing device 106 according to an example embodiment. The server computing device 106 includes computer readable media (CRM) 702 on which the product placement server application 602 is stored. The computer readable media 702 may include volatile media, nonvolatile media, removable media, non-removable media, and/or another available medium that can be accessed by the processor 120. By way of example and not limitation, the computer readable media 702 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

The product placement server application 602 includes an accounts module 704 for receiving and storing information associated with accounts for using the product placement system 100. The accounts include studio user accounts and fashion user accounts. The information associated with the accounts may include username and password information, address information, payment information, contact information, project information, and clothing information, among other information. The accounts module 704 stores the information in the database 108 and/or the memory 122.

The product placement server application 602 further includes a product placement receiver module 706 for receiving a new product placement opportunity from a studio client computing device 102 or a fashion client computing device 104. The new product placement opportunity may have one or more of a date/time of initiation of the product placement opportunity, a need-by date/time for the product placement opportunity, an ending time of the product placement opportunity, an associated studio user, an associated fashion user, an associated project, an associated character, an associated scene, an associated product, a type of product placement opportunity, time on screen, a number of scenes on screen, an associated season, an associated episode, a quantity, pricing information, and/or product information such as a name, a SKU, a color, a size, etc. The product placement receiver module 706 receives information associated with the new product placement opportunity and stores the information associated with the new product placement opportunity in the database 108 and/or the memory 122.

In one example, the product placement opportunity may be associated with a placement request where a fashion user or a studio user proposes a same or similar product placement opportunity to one or more other users. The product placement request may be accepted as offered. However, the one or more other users may propose counteroffers. A counteroffer may include alternate or modified terms for the product placement request including price, type of product placement request, time on screen, a number of scenes on screen, quantity, size, and need-by-date, among other terms. The user who initiates the product placement request may select the best counteroffer or may propose an additional counteroffer until the product placement opportunity is finalized or the product placement opportunity is rescinded. Alternatively, a product placement opportunity may be associated with an auction where the participants are invited to bid or submit a counteroffer for the product placement opportunity. The bid or counteroffer may include a price and/or a type of product placement opportunity. The bid or counteroffer also may include a time on-screen for an associated product or a number of scenes on screen for the associated product. A best bid or offer may win the product placement opportunity. In another example, the product placement opportunity may have a set price and/or a set type of product placement opportunity where the first participant to agree to the set price and/or the set type of product placement opportunity wins the product placement opportunity.

As an example, there may be a fee for placing the product placement opportunity on the marketplace. As another example, there may be a fee for finalizing or consummating a product placement agreement through the marketplace. The fee may be a percentage of a price/a cost of the product associated with the product placement opportunity. As another example, the product placement opportunity may have a fixed fee.

The product placement server application further includes a product placement notifier module 708 for notifying one or more studio client computing devices 102 and/or one or more fashion client computing devices 104 of new and/or requested product placement opportunities received by the product placement receiver module 706.

In a first aspect, the product placement notifier module 708 may provide a product placement marketplace for a plurality of product placement opportunities. The product placement marketplace may comprise a list of one or more currently available product placement opportunities and information associated with each of the one or more currently available product placement opportunities. The product placement notifier module 708 may receive requests for a list of one or more currently available product placement opportunities and transmit information associated with the one or more currently available product placement opportunities to client computing devices.

According to an example embodiment, the product placement marketplace may provide the list of one or more currently available product placement opportunities sorted according to a particular variable. In another example, each studio or fashion user may have a list of one or more related product placement opportunities sorted according to a particular variable. As an example, the list may be sorted based on product placement opportunities ending first, product placement opportunities ending last, product placement opportunity need-by date, product placement type, location, price, popular fashion user, popular studio user, favorite studio user, favorite fashion user, highest rated fashion user, highest rated studio user, on-screen personality, color, size, product category, product popularity, product introduction to market date, production type, production category, and other variables.

In a second aspect, the product placement notifier module 708 may send a message including information about a new and/or desirable product placement opportunity to one or more user recipients. The message may be an email, a text message, a push notification, and other types of messages.

The product placement notifier module 708 queries the database 108 for one or more potential fashion recipients or one or more potential studio recipients that may be interested in the product placement opportunity and notifies one or more fashion client computing devices 104 or one or more studio client computing devices 102 of the product placement opportunity. The product placement notifier module 708 determines the one or more potential user recipients based on setup information, past product placement agreements, past product placement opportunities, and/or other information. The information in the message may include one or more of a start date/time of the product placement opportunity, a need-by date/time for the product placement opportunity, an ending time of the product placement opportunity, an associated studio user, an associated fashion user, an associated project, an associated season, an associated episode, a time on screen, an associated character, an associated scene or a number of scenes on screen, an associated product, a type of product placement opportunity, a quantity, pricing information, and/or product information such as a name, a SKU, one or more colors, a pattern, a size, etc.

In a third aspect, the product placement notifier module 708 may send a message including information about a counteroffer associated with a product placement opportunity to one or more user recipients including any new amended terms associated with the product placement opportunity. The message may be an email, a text message, a push notification, and other types of messages.

The product placement server application 602 includes a negotiation module 710 that facilitates negotiation between one or more studio client computing devices 102 and one or more fashion client computing devices 104. As an example, the negotiation module 710 receives requests from the one or more studio client computing devices 102 and one or more fashion client computing devices 104 to accept a product placement opportunity, reject a product placement opportunity, initiate a counteroffer associated with a product placement opportunity to modify one or more terms of the product placement opportunity, accept a counteroffer associated with a product placement opportunity, and reject a counteroffer associated with a product placement opportunity, among other requests. In response to these requests, the negotiation module 710 transmits a message to the one or more studio client computing devices 102 and the one or more fashion client computing devices 104 associated with the requests. The negotiation process may continue until the product placement opportunity is accepted or rejected, or an ending time associated with the product placement opportunity that may effectively terminate the product placement opportunity.

As an example, a fashion user may not be able to fulfill a desired product placement opportunity because the desired quantity is too large or because a timeframe is too short. As another example, the fashion user or the studio user may be unwilling to accept one or more terms of the product placement opportunity. The fashion user may modify one or more terms of the product placement opportunity and send the counteroffer with the modified terms to the studio user. The studio user may then accept the counteroffer or reject the counteroffer. As another example, the fashion user may accept the product placement opportunity without modifying any terms. Upon acceptance, a contract is entered between the studio user and the fashion user. The negotiation module 710 stores the terms of the finalized product placement agreement in the database 108 and/or the memory 122. The negotiation module 710 may receive an expected date for delivery of the product and tracking information from the fashion client computing device 104 and transmit the expected date for delivery of the product, tracking information, and other finalized product placement agreement information to the studio client computing device 102. The fashion user and the studio user may receive a message including the expected date for delivery of the product, tracking information, and other finalized product placement agreement information. The finalized product placement agreement information may include a final type of the product placement opportunity and/or a final price for the product placement opportunity, among other information. The message may be an email, a text message, a push notification, and other types of messages.

The product placement server application 602 includes an escrow module 712. When a product placement opportunity is accepted and payment is involved, the escrow module 712 receives payment and payment information from the one or more studio client computing devices 102 and the one or more fashion client computing devices 104. The escrow module 712 holds the payment and/or forwards the payment to one or more banking computing devices to hold the payment. Upon completion of a contract associated with the product placement opportunity, the escrow module 712 may release payment and/or send a message to the one or more banking computing devices to release payment to the one or more studio client computing devices 102 or the one or more fashion client computing devices 104. In addition, the escrow module may charge the studio user and/or the fashion user the fee associated with the product placement agreement. The escrow module 712 may store information associated with the payment in the database 108 and/or the memory 122.

Upon completion of the contract, the fashion user and the studio user may "favorite" or "like" the other fashion user or studio user associated with the product placement agreement thereby creating a list of one or more "favorite" users. The list of one or more "favorite" users may be stored in the database 108. The fashion user or the studio user may also rate and/or review the product placement agreement. The escrow module 712 transmits a review message to the fashion user and the studio user to rate and/or review the transaction on a particular scale and according to particular aspects of the transaction, such as negotiations, product quality, promptness, and fulfillment of obligations associated with the transaction. After a "favorite," a "like," and/or a rating/review is submitted and stored in the database 108, the escrow module 712 transmits a message to the fashion user and the studio user including information regarding the "favorite," the "like" and/or the rating/review. The message may be an email, a text message, a push notification, and other types of messages.

The product placement server application 602 includes a statistics module 714 to receive and store information associated with each product placement opportunity received by the product placement server application 602. The information associated with each product placement opportunity may include a start date/time of the product placement opportunity, a need-by date/time for the product placement opportunity, an ending time of the product placement opportunity, an acceptance time of the product placement opportunity, an associated studio user, an associated fashion user, an associated project, an associated character, an associated scene, an associated product, a type of product placement opportunity, a quantity, pricing information, and counteroffer information, among other information. The type of product placement opportunity may include a paid product placement opportunity, an in-kind or promotional product placement opportunity, a pull product placement opportunity, and a purchase product placement opportunity, among other types. This information may be stored in the database 108 and/or in the memory 122, among other locations.

The statistics module 714 may generate statistics or analytics about current or past product placement opportunities. As an example, the statistics module 714 may generate a return on investment analytics for fashion users or budget impact analytics for studio users. As another example, the statistics module 714 may generate a list or visual representation of current product placement opportunities for a particular fashion user or a particular studio user or past product placement opportunities for a particular fashion user or a particular studio user over a particular period of time. As another example, the statistics module 714 may generate a list or visual representation of current product placement opportunities available in the marketplace or past product placement opportunities over a particular period of time in the marketplace. As an additional example, the statistics module 714 may generate average values and/or a visual representation of current product placement opportunities available in the marketplace or past product placement opportunities over a particular period of time in the marketplace. As an additional example, the statistics module 714 may generate a list or visual representation of current and/or past product placement opportunities that are associated with a particular on-screen personality, a particular studio user, or a particular fashion user. The visual representation may be a graph that is one of a pie graph, a bar graph, and a line graph, among other types of graphs.

The product placement server application 602 includes a user interface module 716. The user interface module 716 receives requests from the one or more studio client computing devices 102 and the one or more fashion client computing devices 104 and transmits a representation of requested information and user interface elements to the studio client computing device 102 and the fashion client computing device 104 for display on the display 204 and the display 404. As an example, the user interface module 716 generates a native and/or web-based graphical user interface (GUI) that accepts input and provides output by generating web content that is transmitted via the communication network 110 and viewed by a user of the studio client computing device 102 and/or a user of the fashion client computing device 104. The user interface module 716 may provide realtime automatically and dynamically refreshed information to the user of the studio client computing device 102 and the fashion client computing device 104 using Java, Javascript, AJAX (Asynchronous Javascript and XML), Microsoft .NET, and/or node.js, among others. The user interface module 716 may send data to other modules of the product placement server application 602 of the server computing device 106, and retrieve data from other modules of the product placement server application 602 of the server computing device 106 asynchronously without interfering with the display and behavior of the web page displayed on the studio client computing device 102 and the fashion client computing device 104. As an example, data may be retrieved using XMLHttpRequest objects.

Figure 8:
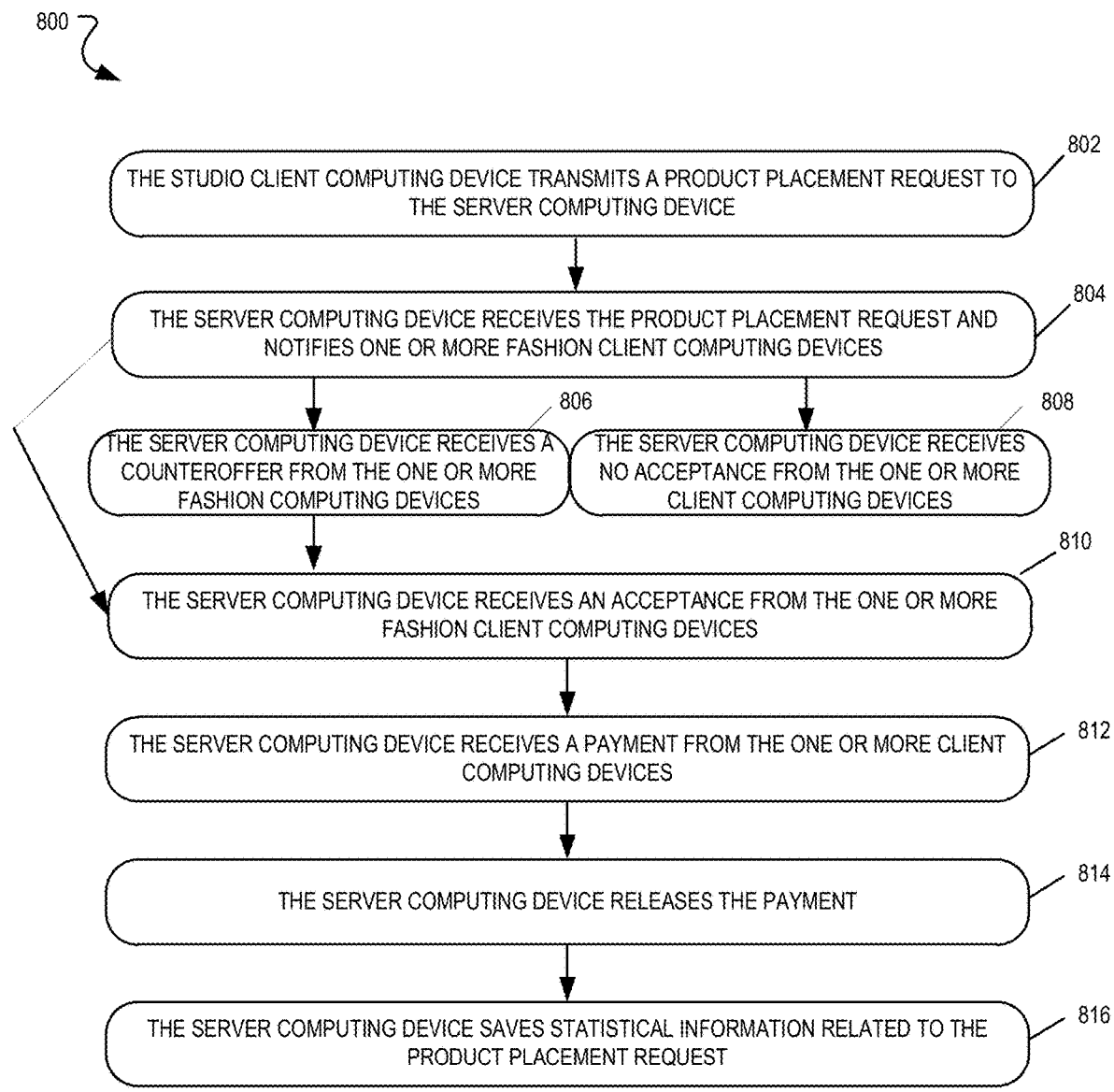
FIG. 8 illustrates a flowchart of a process for creating a product placement opportunity by the studio client computing device according to an example embodiment.

FIG. 8 illustrates a flowchart of a process 800 for creating a product placement opportunity by the studio client computing device 102 according to an example embodiment. The process 800 shown in FIG. 8 begins in step 802.

In step 802, the studio client computing device 102 transmits a product placement opportunity creation request to the server computing device 106. In step 804, the server computing device 106 receives the product placement opportunity creation request. The server computing device 106 stores information associated with the product placement opportunity creation request in the database 108 and/or the memory 122. The server computing device 106 queries the database 108 for one or more potential fashion recipients that may be interested in the product placement opportunity and notifies one or more fashion client computing devices 104 of the product placement opportunity.

In step 806, the server computing device 106 receives a counteroffer from the one or more fashion computing devices 104. As an example, the fashion user may be unable and/or unwilling to fulfill one or more terms of the product placement opportunity, e.g., price, product placement type, a need-by date, or a quantity. The fashion user may modify the one or more terms of the product placement opportunity. The server computing device 106 notifies the studio client computing device 102 of the counteroffer. The studio client computing device 102 may accept the counteroffer from the one or more fashion computing devices 104, reject the counteroffer from the one or more fashion computing devices 104, or make another counteroffer. If the studio client computing device 102 makes another counteroffer, the server computing device 106 receives the another counteroffer and transmits the counteroffer to the fashion computing device 104 associated with the counteroffer. This process may continue until the product placement opportunity is accepted or rejected, or an ending time associated with the product placement opportunity, effectively terminating the product placement opportunity.

In step 808, the server computing device 106 may receive no acceptance from the one or more fashion client computing devices 104. If the server computing device 106 does not receive an acceptance from the one or more fashion client computing devices 104 before an ending date/time of the product placement opportunity, the process may end.

In step 810, the server computing device 106 receives an acceptance for the product placement opportunity from one of the fashion client computing devices 104. Upon receipt of the acceptance, the server computing device 106 transmits a message to the studio client computing device 102 that created the product placement opportunity to notify the user that the product placement opportunity has been accepted. This message may include information associated with the product placement opportunity and may provide the user with additional information associated with the product placement opportunity including a final type of the product placement opportunity, a final price for the product placement opportunity, an expected date for delivery of the product, tracking information, and/or other information.

In step 812, the server computing device 106 transmits a message to the one or more studio client computing devices 102 and/or the one or more fashion client computing devices 104 requesting payment for the product placement opportunity and/or the product associated with the product placement opportunity. The escrow module 712 of the product placement server application 602 may facilitate the payment. The server computing device 106 facilitates the payment for the product placement opportunity and/or the product associated with the product placement opportunity, and receives the payment for the product placement opportunity and/or the product associated with the product placement opportunity. As an example, there may be a fee for placing the product placement opportunity on the marketplace, and/or finalizing or consummating the product placement opportunity through the marketplace. The fee may be a percentage of a price/a cost of the product associated with the product placement opportunity. As another example, the product placement opportunity may have a fixed fee. The escrow module 712 may transmit the payment to one or more bank computers.

In step 814, after a contract associated with the product placement opportunity is fulfilled, the server computing device 106 may release the payment. As an example, the escrow module 712 may transmit a message to the one or more bank computers to release the payment.

In step 816, the statistics module 716 of the server computing device 106 may store statistics associated with the product placement opportunity. The statistics may include a date/time of initiation of the product placement opportunity, a need-by date/time for the product placement opportunity, an ending time of the product placement opportunity, an acceptance time of the product placement opportunity, an associated studio user, an associated fashion user, an associated project, an associated season, an associated episode, an associated character, an associated scene, an associated product, a type of product placement opportunity, a quantity, pricing information, and counteroffer information, among other information. The type of product placement opportunity may include a paid product placement opportunity, an in-kind or promotional product placement opportunity, a pull product placement opportunity, and a purchase product placement opportunity, among other types.

Figure 9:
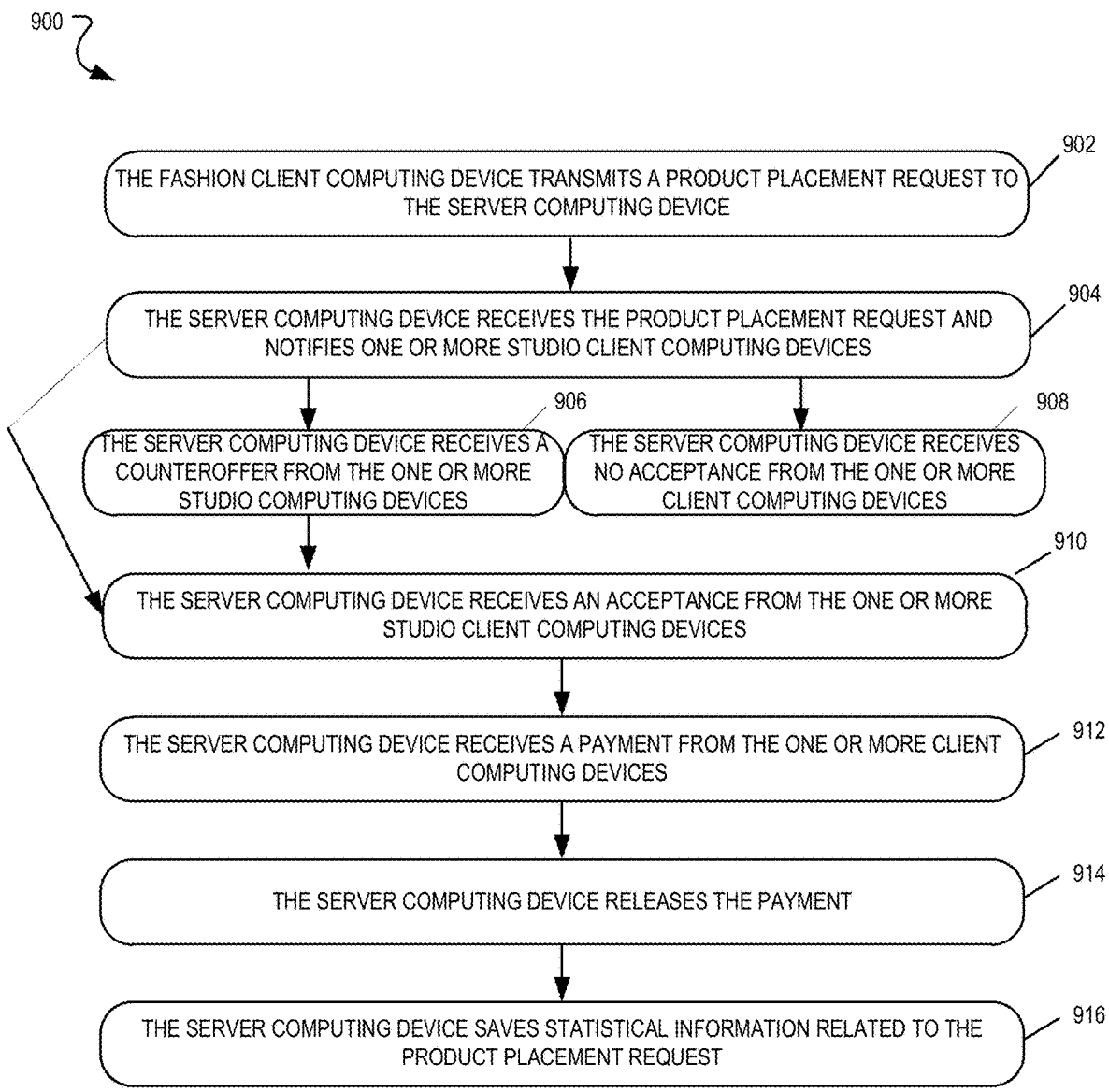
FIG. 9 illustrates a flowchart of a process for creating a product placement opportunity by the fashion client computing device according to an example embodiment.

FIG. 9 illustrates a flowchart of a process 900 for creating a product placement opportunity by the fashion client computing device 104 according to an example embodiment. The process 900 shown in FIG. 9 begins in step 902.

In step 902, the fashion client computing device 104 transmits a product placement opportunity creation request to the server computing device 106. In step 904, the server computing device 106 receives the product placement opportunity creation request. The server computing device 106 stores information associated with the product placement opportunity creation request in the database 108 and/or the memory 120. The server computing device 106 queries the database 108 for one or more potential studio recipients that may be interested in the product placement opportunity and notifies one or more studio client computing devices 102 of the product placement opportunity.

In step 906, the server computing device 106 receives a counteroffer from the one or more studio computing devices 102. The server computing device 106 notifies the fashion client computing device 102 of the counteroffer. The fashion client computing device 104 may accept the counteroffer from the one or more studio computing devices 102, reject the counteroffer from the one or more studio computing devices 102, or make another counteroffer. If the fashion client computing device 104 makes another counteroffer, the server computing device 106 receives the another counteroffer and transmits the counteroffer to the studio computing device 102 associated with the counteroffer. This process may continue until the product placement opportunity is accepted or rejected, or an ending time associated with the product placement opportunity, effectively terminating the product placement opportunity.

In step 908, the server computing device 106 may receive no acceptance from the one or more studio client computing devices 102. If the server computing device 106 does not receive an acceptance from the one or more studio client computing devices 102 before an ending date/time of the product placement opportunity, the process may end.

In step 910, the server computing device 106 receives an acceptance for the product placement opportunity from the one or more studio client computing devices 102. Upon receipt of the acceptance, the server computing device 106 transmits a message to the fashion client computing device 104 that created the product placement opportunity to notify the user that the product placement opportunity has been accepted. This message may include information associated with the product placement opportunity and may provide the user with additional information associated with the product placement opportunity including a final type of the product placement opportunity, a final price for the product placement opportunity, an expected date for delivery of the product, tracking information, and/or other information.

In step 912, the server computing device 106 transmits a message to the one or more studio client computing devices 102 and/or the one or more fashion client computing devices 104 requesting payment for the product placement opportunity and/or the product associated with the product placement opportunity. The escrow module 712 of the product placement server application 602 may facilitate the payment. The server computing device 106 facilitates the payment for the product placement opportunity and/or the product associated with the product placement opportunity, and receives the payment for the product placement opportunity and/or the product associated with the product placement opportunity. As an example, the product placement opportunity may have a fee associated with a percentage of a price/a cost of the product placement opportunity. As another example, the product placement opportunity may have a fixed fee. The escrow module 712 may transmit the payment to one or more bank computers.

In step 914, after a contract associated with the product placement opportunity is fulfilled, the server computing device 106 may release the payment. As an example, the escrow module 712 may transmit a message to the one or more bank computers to release the payment.

In step 916, the statistics module 716 of the server computing device 106 may store statistics associated with the product placement opportunity. The statistics may include a date/time of initiation of the product placement opportunity, a need-by date/time for the product placement opportunity, an ending time of the product placement opportunity, an acceptance time of the product placement opportunity, an associated studio user, an associated fashion user, an associated project, an associated season, an associated episode, an associated character, an associated scene, an associated product, a type of product placement opportunity, a quantity, pricing information, and counteroffer information, among other information. The type of product placement opportunity may include a paid product placement opportunity, an in-kind or promotional product placement opportunity, a pull product placement opportunity, and a purchase product placement opportunity, among other types.

In one aspect, the studio client computing device 102 and/or the fashion client computing device 104 may operate in "offline" mode, meaning that the client computing device may store product placement opportunity data locally if a network connection is unreliable and/or unavailable. When the studio client computing device 102 and/or the fashion client computing device 104 next connects to a network, the computing device may transmit the product placement opportunity data to the server computing device 106. Additionally, when the studio client computing device 102 and/or the fashion client computing device 104 next connects to the network, the server computing device 106 may transmit product placement opportunity data to the client computing device.

In another aspect, the one or more studio users and the one or more fashion users may determine whether products are currently being used in other projects. As an example, a studio user and/or a fashion user may select a product and view a list and/or visual representation of other uses of the product in other projects. As an example, the list may indicate that a particular product is being worn by a particular actor in a fifteenth scene in a feature-length project as part of a first costume in the fifteenth scene, among other uses. A fashion user may be able to view information regarding each of the uses of their products in studio productions. In addition, in certain instances, if a first studio user chooses to share details regarding use of products with other studio users, a second studio user may be able to view information regarding the first studio user's use of the products. The second studio user may take this information into consideration when determining whether to accept, reject, or create a product placement opportunity. In other words, a studio user can view information regarding prior use of a certain product by other studio users in entertainment content.

In another aspect, the product placement studio application 202 of the studio client computing device 102 may receive a script document or script file having a script and parse the script to automatically perform a script breakdown for a studio user. The script document or script file may be a MICROSOFT® Word file (*.doc/*.docx), a FINAL DRAFT® file (*.fdx), a Portable Document Format File (*.pdf) and other proprietary and open-source file types. The product placement studio application 202 of the studio client computing device 102 may use data from the script breakdown, and other information from the product placement studio application 102 to determine one or more product placement opportunities in the script. As an example, the product placement studio application 202 may parse the script to determine the one or more product placement opportunities in the script or the product placement studio application 202 may transmit information associated with the product placement opportunities to the server computing device 106. The product placement server application 602 also may determine the one or more product placement opportunities in the script. The studio user can manage, edit and customize the information resulting from the parsing of the script by the product placement studio application 202 and/or the product placement server application 602. After the one or more product placement opportunities are determined, the product placement studio application 202 may recommend products from the product placement marketplace associated with the one or more product placement opportunities in the script, the studio user may view the one or more product placement opportunities, edit information associated with the one or more product placement opportunities to add additional details and/or remove any inaccuracies using the product placement studio application 202, and submit the one or more product placement opportunities to the product placement marketplace.

In another aspect, the product placement studio application 202 of the studio client computing device 102 or the product placement fashion application 402 of the fashion client computing device 104 may use the optional camera device to take a photograph of a product or another object. The product placement studio application 202 or the product placement fashion application 402 may determine one or more color elements in the photograph of the product or the object and determine one or more colors of the product or object. The product placement fashion application 402 may transmit information associated with the one or more colors of the product to the product placement server application 602.

Optionally, in an additional aspect, the product placement studio application 202 or the product placement fashion application 402 may upload the photograph to the product placement server application 602 of the server computing device 106. The product placement server application 602 of the server computing device 106 may determine one or more color elements of the uploaded photograph.

The product placement server application 602 may determine one or more product placement opportunities associated with a product having a color that is similar to the one or more determined colors. The product placement server application 602 of the server computing device 106 transmits a list and/or a visual representation of the one or more product placement opportunities associated with a product having a color that is similar to the one or more determined colors. As an example, the photograph may include an orange dress. The product placement server application 602 of the server computing device 106 determines one or more product placement opportunities associated with an orange dress and transmits a list or a visual representation of the one or more product placement opportunities associated with an orange dress.

In another aspect, one or more viewer client computing devices having a viewer user application may receive information associated with the product placement marketplace. The viewer client computing device may be a computer having a processor and memory including but not limited to an internet-connected or smart television, an internet-connected or smart display, a laptop, desktop, tablet computer, mobile computing device (e.g., a smartphone) or a dedicated electronic device having a processor and memory. The one or more processors may process machine/computer-readable executable instructions and data, and the memory may store machine/computer-readable executable instructions and data including one or more applications, including the viewer user application. The processor and memory are hardware. The memory includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

As an example, while viewing a television show or a movie, a viewer viewing the television show receives real-time information via the viewer user application about products being worn by on-screen personalities when shown on screen. The viewer may receive a message or a push notification that provides information about the products currently being worn by the on-screen personalities. The viewer may have the opportunity to purchase the products directly using the viewer user application on the viewer client computing device. In one example, the viewer may select one or more on-screen personalities that are favorite actors or one or more fashion designers or fashion retailers that are favorite fashion designers or fashion retailers. When the one or more favorite actors appear on screen, the viewer may receive the message or push notification about products of the costume of the favorite actor. When the one or more fashion designers or fashion retailers appear on screen, the viewer may receive the message or push notification about products shown on screen provided by the fashion designers or fashion retailers. The viewer may use the viewer client computing device to mark the products for a later purchase, place the products in a basket or cart, or purchase the products from a fashion user affiliated with the product placement marketplace. While the viewer is in the process of purchasing the products, the television show or the movie may automatically pause until the transaction is complete. After the transaction is complete, the television show or the movie may continue from the paused position. In another example, the television show or the movie may continue showing while the viewer is in the process of purchasing the products. Purchase information may be stored in the database 108 and may be shared with the fashion users and the studio users.

In another example, the viewer user application of the viewer client computing device may display a list of products for discovery or purchase that are sorted based on at least one particular variable. As an example, the particular variable may be recently placed products, price, a popular fashion user, a popular studio user, a favorite studio user, a favorite fashion user, a highest rated fashion user, a highest rated studio user, an on-screen personality, a popular on-screen personality, a favorite on-screen personality, a color, a size, a product category, a product popularity, a product introduction to market date, a production type, a production category, a brand, an episodic entertainment production (e.g., a television show), and a movie, among other particular variables.

According to a further embodiment, the server computing device 106 may provide a web application programming interface (API). The API may define HTTP request messages and the structure of response messages. The API may be a public and/or private API that provides a specification of remote calls exposed to consumer devices, e.g., studio client computing devices 102 and fashion client computing devices 104. The API may be a REST API and/or a SOAP API, among others. The server computing device 106 may receive an HTTP request formatted according to the API and transmit a response that may be in an XML (Extensible Markup Language) format or JSON (Javascript Object Notation) format, among other formats.

The product placement marketplace 100 of the product placement system 100 is not limited to episodic and feature-length entertainment productions. The product placement system 100 may be modified for use with video game productions, commercial productions, documentaries, web-based productions, books, music videos, and other productions.

Figure 10:
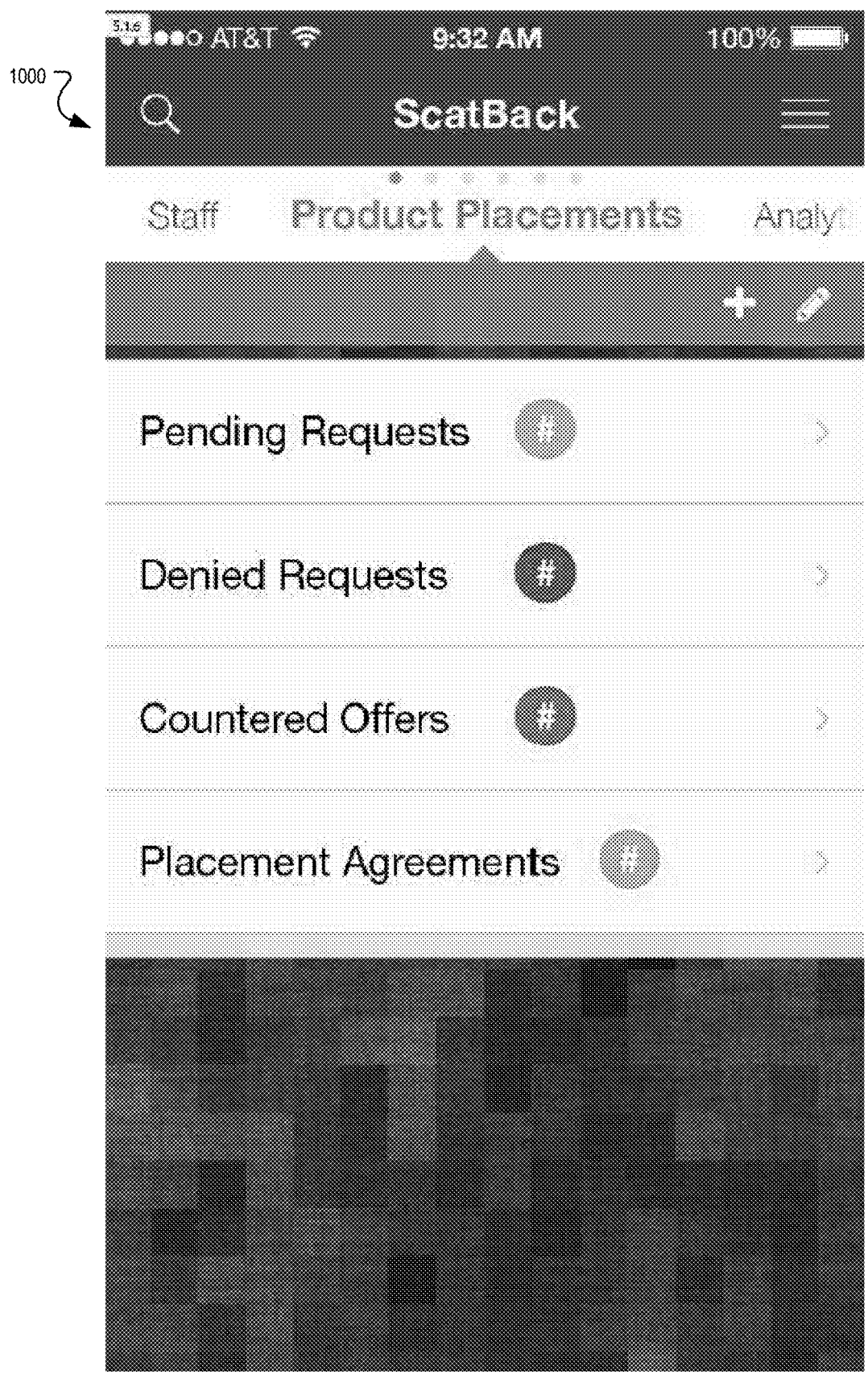
FIGS. 10-31 illustrate example screenshots of a user interface displayed on a display of the studio client computing device and/or the fashion client computing device according to an example embodiment.

FIG. 10 shows a screenshot 1000 of a user interface displayed on the display 204 or 404 of the studio client computing device 102 or the fashion client computing device 104 that includes resources and data transmitted by the product placement server application 602 of the server computing device 106. The user interface shown in screenshot 1000 is a product placements status user interface and shows four different rows in a tableview. If a user selects the "Pending Requests," then the display 204 or 404 may display information associated with "Pending Requests." If the user selects the "Denied Requests," then the display 204 or 404 may display information associated with "Denied Requests." If the user selects "Countered Offers," then the display 204 or 404 may display information associated with "Countered Offers." If the user selects "Placement Agreements," then the display 204 or 404 may display information associated with finalized and/or active "Placement Agreements," e.g., contracts.

Figure 11:
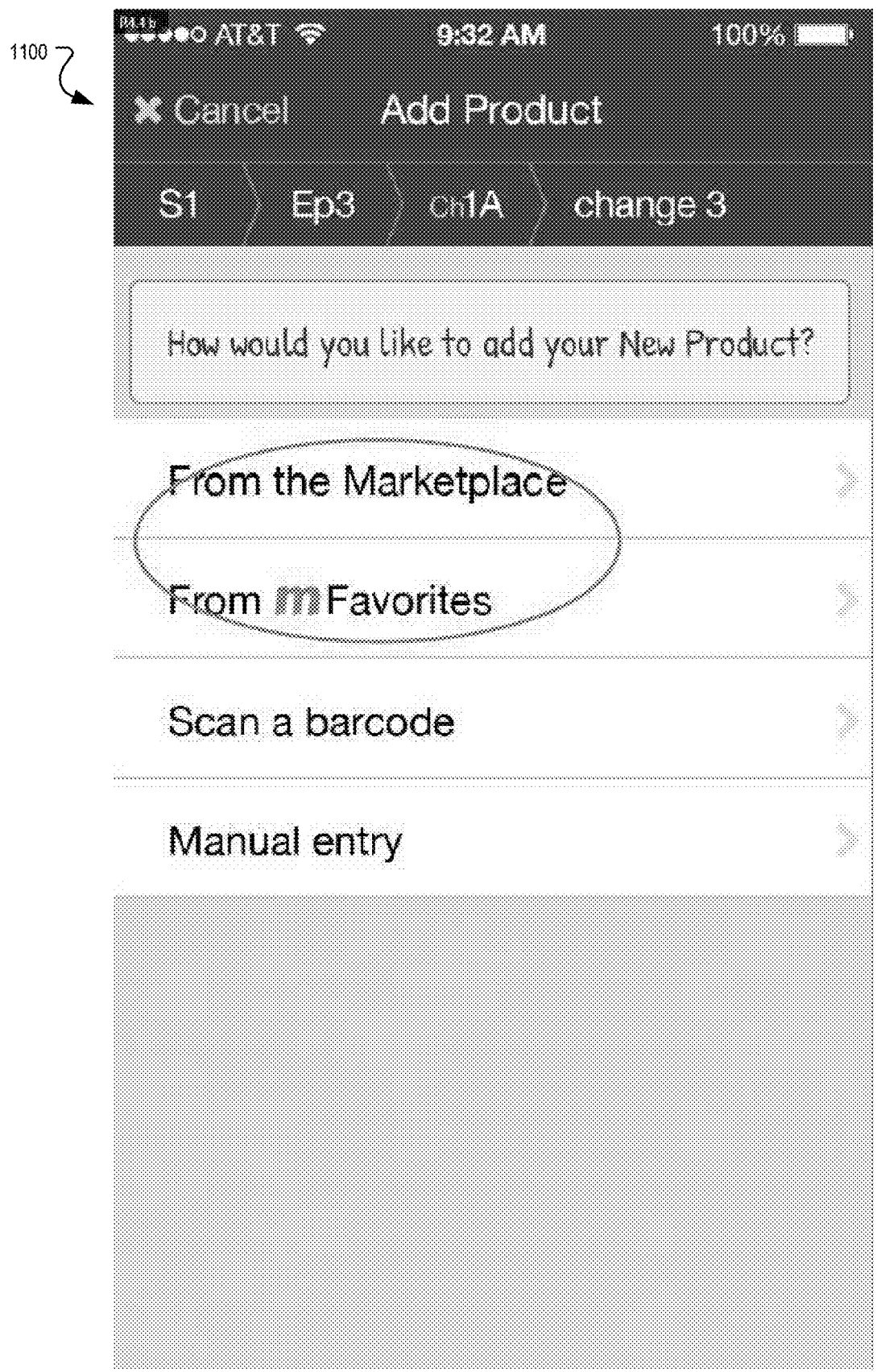

FIG. 11 shows a screenshot 1100 of a user interface displayed on a display 204 of the studio client computing device 102 that includes resources and data transmitted by the product placement server application 602 of the server computing device 106. The user interface shown in screenshot 1100 is an Add Product user interface and shows four different rows in a tableview. According to an example embodiment, a user may add a product to a character costume from the product placement marketplace, add a product to a character costume from a list of favorite products, add a product to a character costume by scanning a barcode of the product using the camera device, or add a product to a character costume by manually entering information and transmitting the information to the product placement server application 602 of the server computing device 106.

Figure 12:
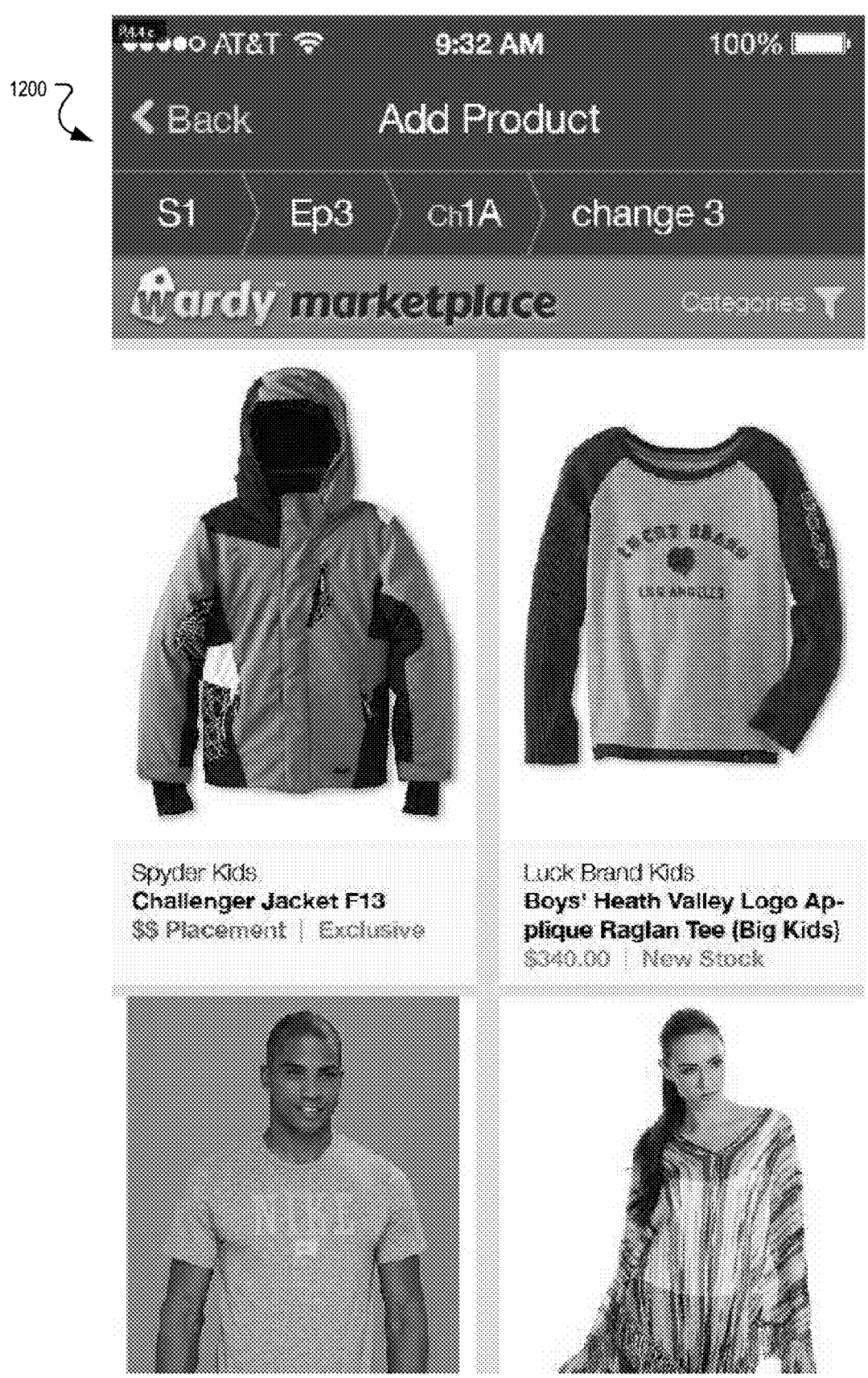

FIG. 12 shows a screenshot 1200 of a user interface displayed on a display 204 of the studio client computing device 102 that includes resources and data transmitted by the product placement server application 602 of the server computing device 106. The user interface shown in screenshot 1200 is based on the user interface shown in FIG. 11 and shows a user interface for adding a product to a character costume from the product placement marketplace.

Figure 13:

FIG. 13 shows a screenshot 1300 of a user interface displayed on a display 204 of the studio client computing device 102 that includes resources and data transmitted by the product placement server application 602 of the server computing device 106. The user interface shown in screenshot 1300 is a user interface for adding a product to a character costume. As an example, the user interface shown in screenshot 1300 shows a model wearing a "Ralph Lauren Denim & Supply Long Sleeve Fleece Crewneck Sweater."

Figure 14:
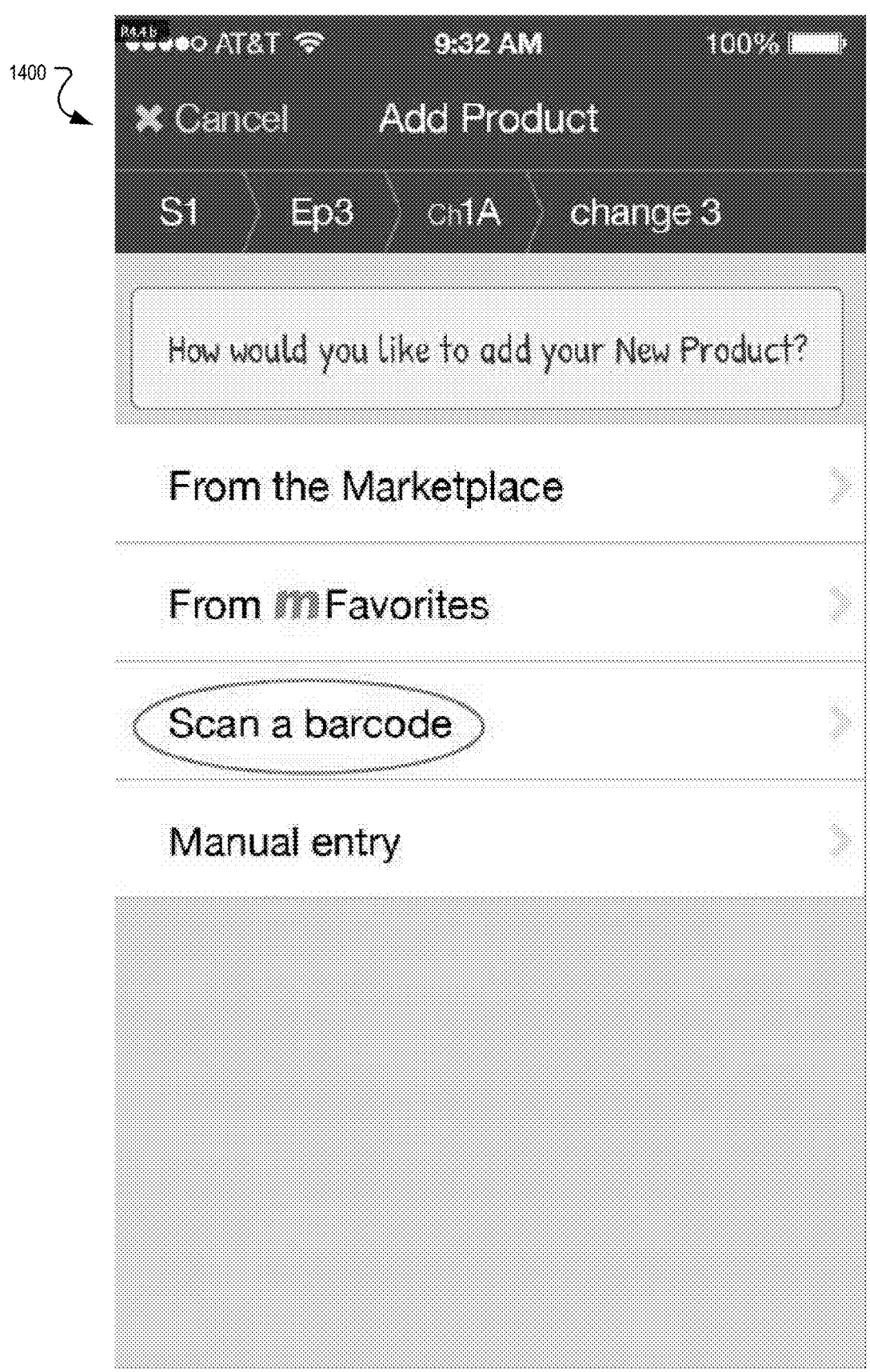

FIG. 14 shows a screenshot 1400 of a user interface displayed on a display 204 of the studio client computing device 102 that includes resources and data transmitted by the product placement server application 602 of the server computing device 106. The user interface shown in screenshot 1400 is a user interface for adding a product to a character costume. As shown in FIG. 14, the user may add the product by scanning a barcode of the product using the camera device of the client computing device.

Figure 15:

FIG. 15 shows a screenshot 1500 of a user interface displayed on a display 204 of the studio client computing device 102 that includes resources and data transmitted by the product placement server application 602 of the server computing device 106. The user interface shown in screenshot 1500 is a user interface for scanning a barcode on the product using the camera device of the client computing device. As an example, the studio client computing device 102 or the fashion client computing device 104 may transmit barcode information to the server computing device 106.

Figure 16:
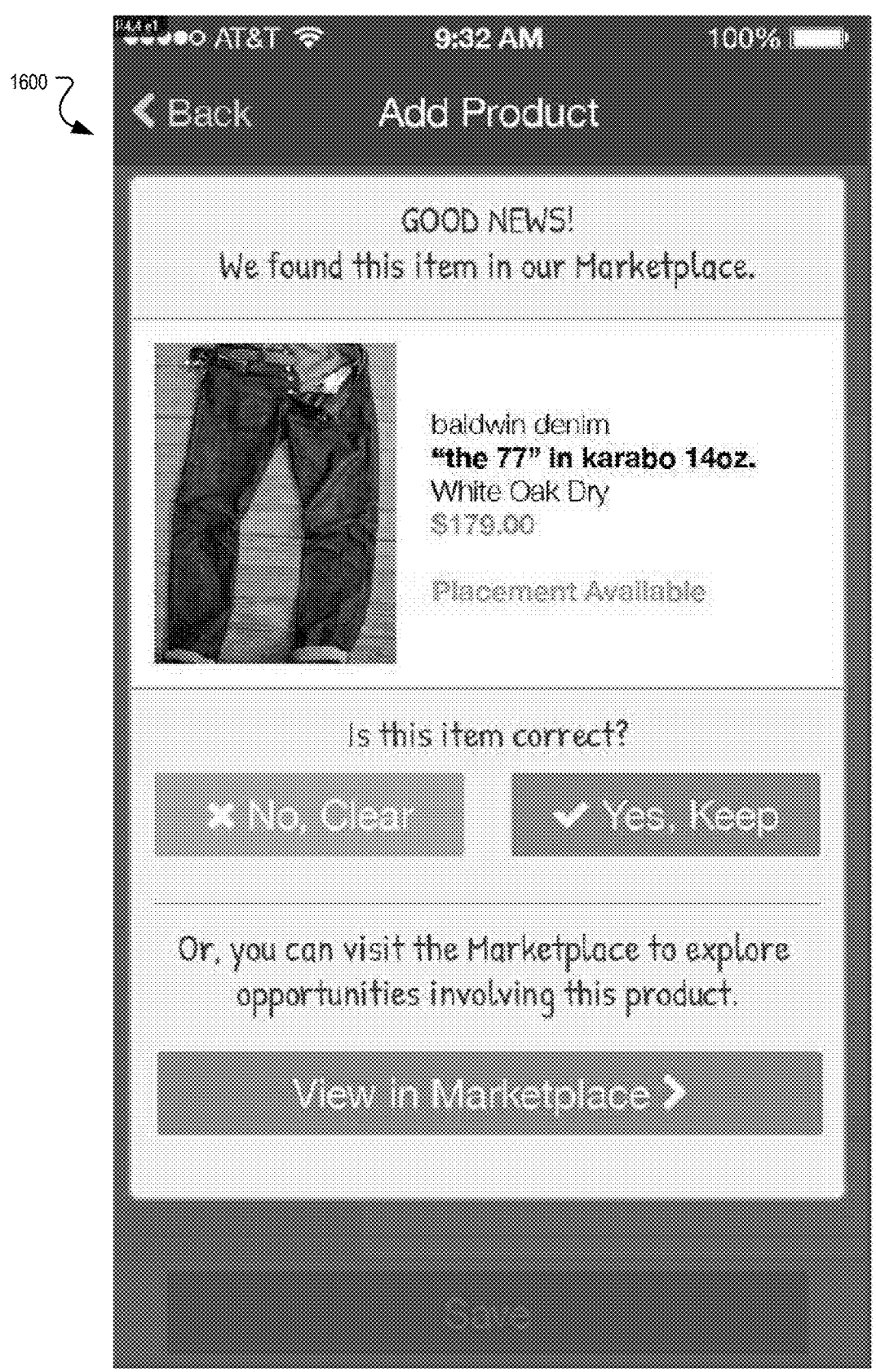

FIG. 16 shows a screenshot 1600 of a user interface displayed on a display 204 of the studio client computing device 102 that includes resources and data transmitted by the product placement server application 602 of the server computing device 106. As shown in FIG. 15, the server computing device 106 receives the barcode information and determines whether the barcode information is associated with a product in the product placement marketplace. The user interface shown in screenshot 1600 is displayed when the product is found in the product placement marketplace. A user may use the user interface shown in screenshot 1600 to add the product directly to a character costume.

Figure 17:
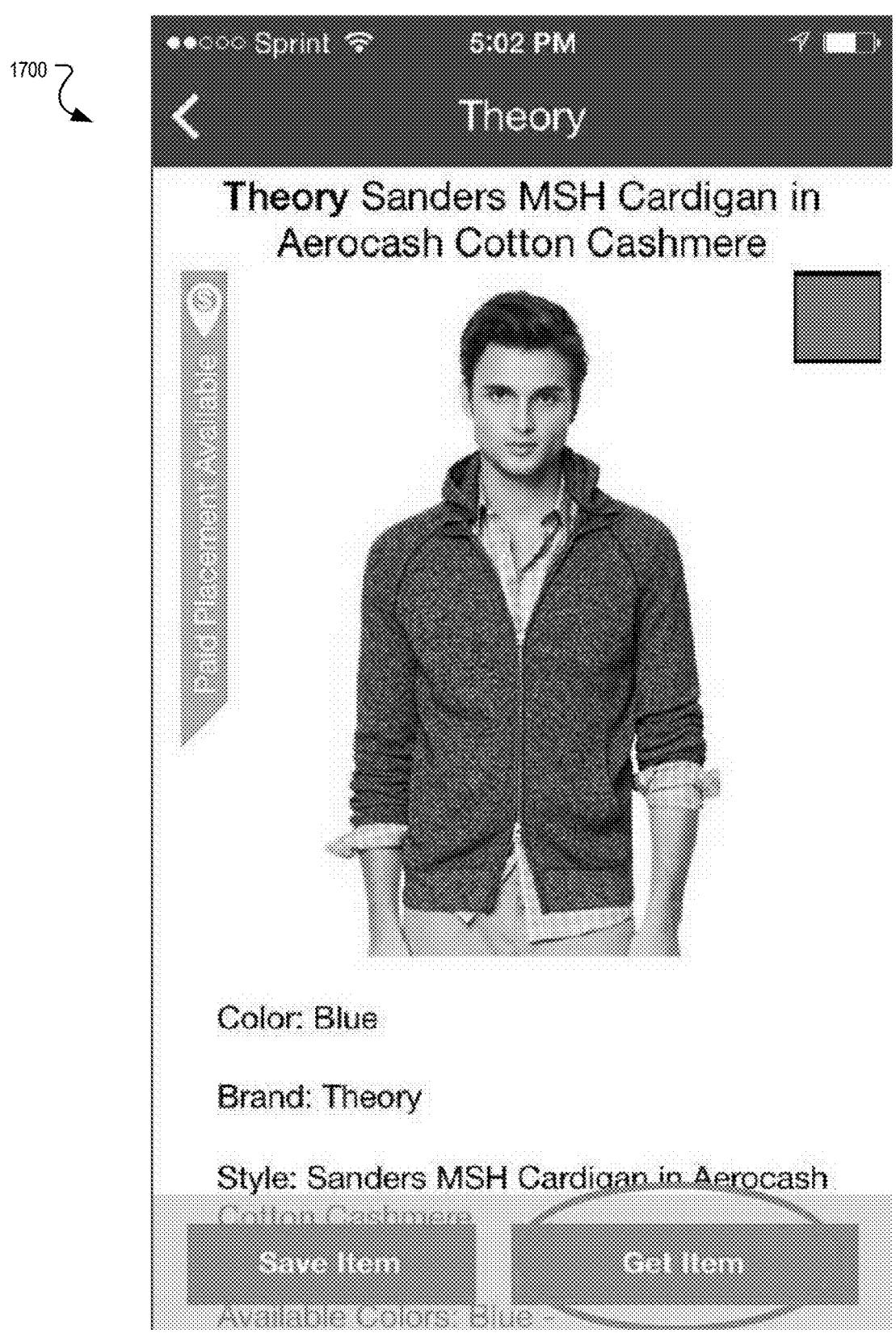

FIG. 17 shows a screenshot 1700 of a user interface displayed on a display 204 of the studio client computing device 102 that includes resources and data transmitted by the product placement server application 602 of the server computing device 106. The user interface shown in screenshot 1700 is a user interface for getting or procuring an item or product. As shown in FIG. 17, there is a paid placement available for the item, "Theory Sanders MSH Cardigan in Aerocash Cotton Cashmere."

Figure 18:

FIG. 18 shows a screenshot 1800 of a user interface displayed on a display 204 of the studio client computing device 102 that includes resources and data transmitted by the product placement server application 602 of the server computing device 106. The user interface shown in screenshot 1800 is a user interface for getting or procuring an item or product. As shown in FIG. 18, the user selects one or more sizes of the product and then selects "Next."

Figure 19:
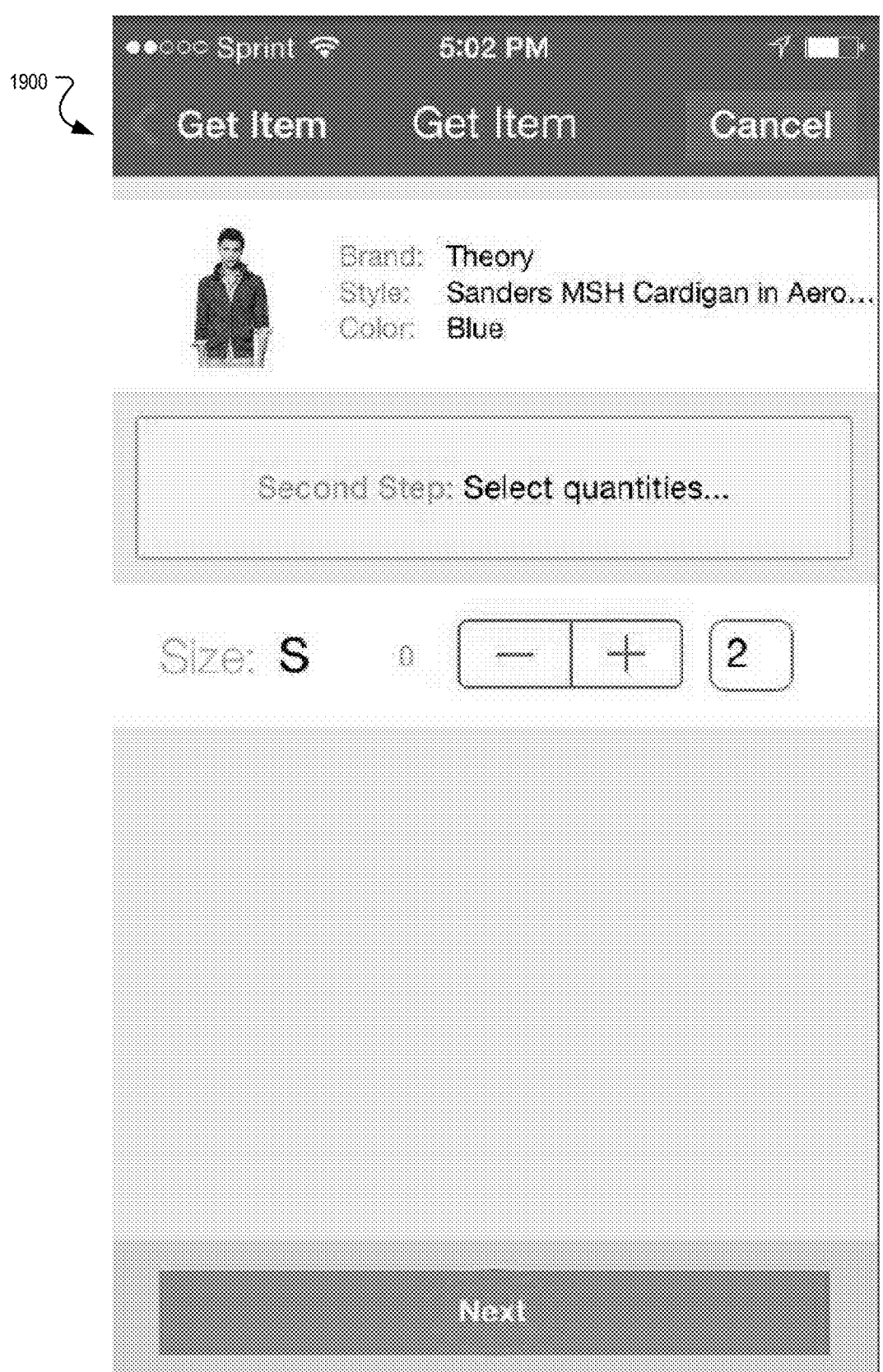

FIG. 19 shows a screenshot 1900 of a user interface displayed on a display 204 of the studio client computing device 102 that includes resources and data transmitted by the product placement server application 602 of the server computing device 106. The user interface shown in screenshot 1900 is a user interface for getting or procuring an item or product. As shown in FIG. 19, the user selects a quantity for each of the one or more sizes of the product and then selects "Next."

Figure 20:
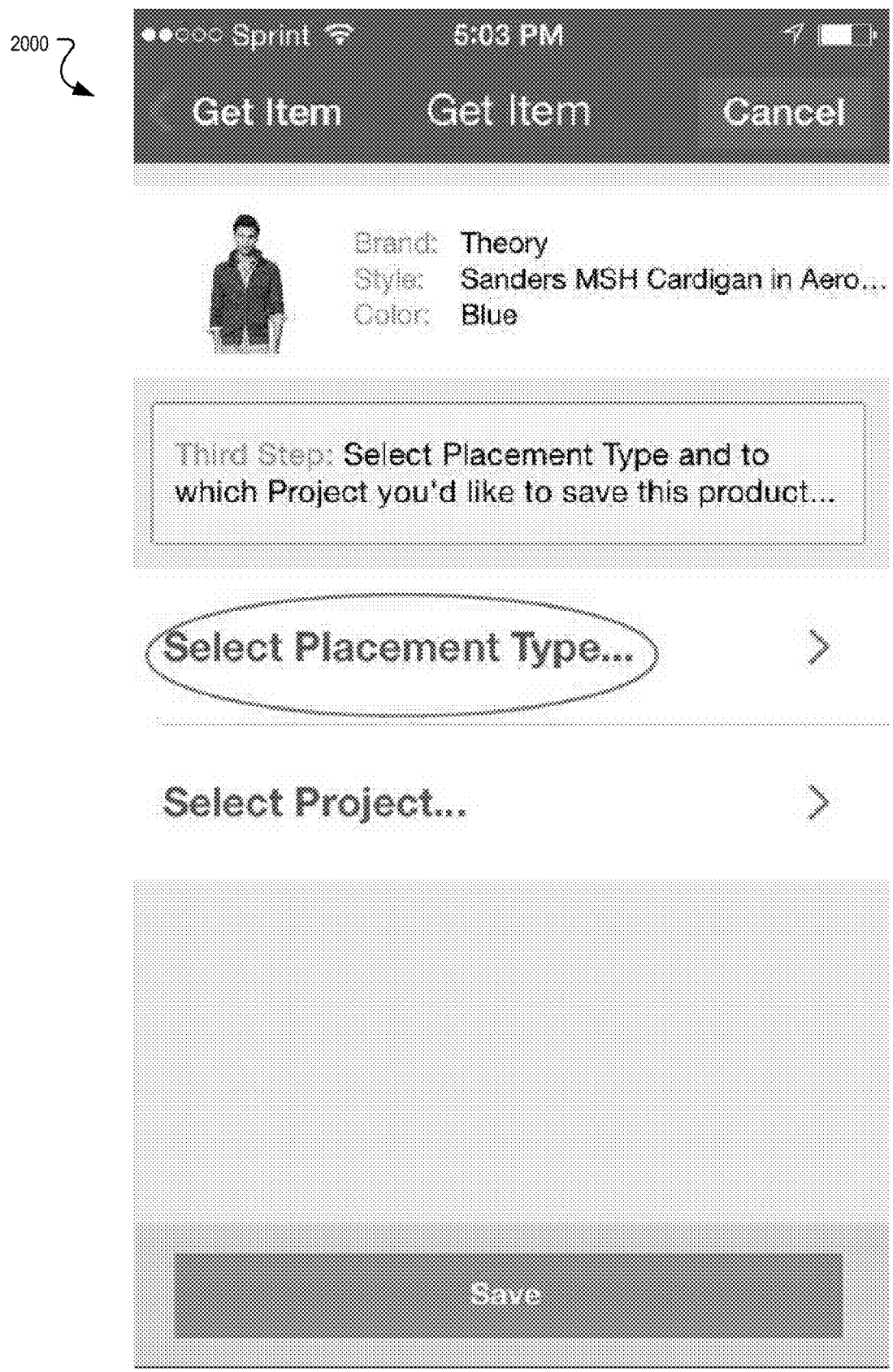

FIG. 20 shows a screenshot 2000 of a user interface displayed on a display 204 of the studio client computing device 102 that includes resources and data transmitted by the product placement server application 602 of the server computing device 106. The user interface shown in screenshot 2000 is a user interface for getting or procuring an item or product. As shown in FIG. 20, the user selects the "Select Placement Type" row of the user interface to open a menu of product placement types for selection.

Figure 21:
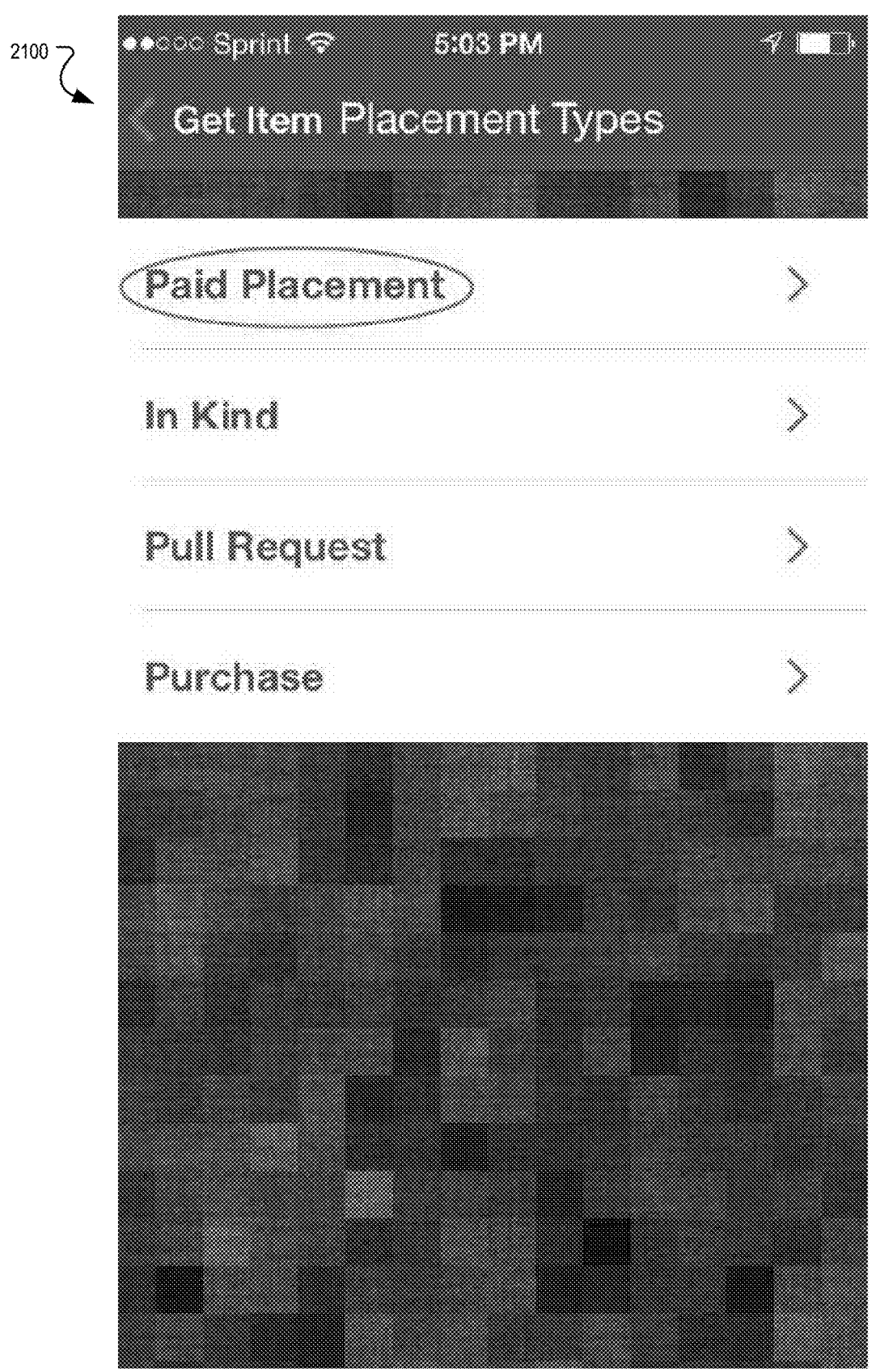

FIG. 21 shows a screenshot 2100 of a user interface displayed on a display 204 of the studio client computing device 102 that includes resources and data transmitted by the product placement server application 602 of the server computing device 106. The user interface shown in screenshot 2100 is a user interface for selecting a product placement type for a product. As shown in FIG. 21, the user may select a Paid Placement, a Promotional Placement (In-Kind), a Pull Request, or a Purchase. In this case, the user selects "Paid Placement."

Figure 22:
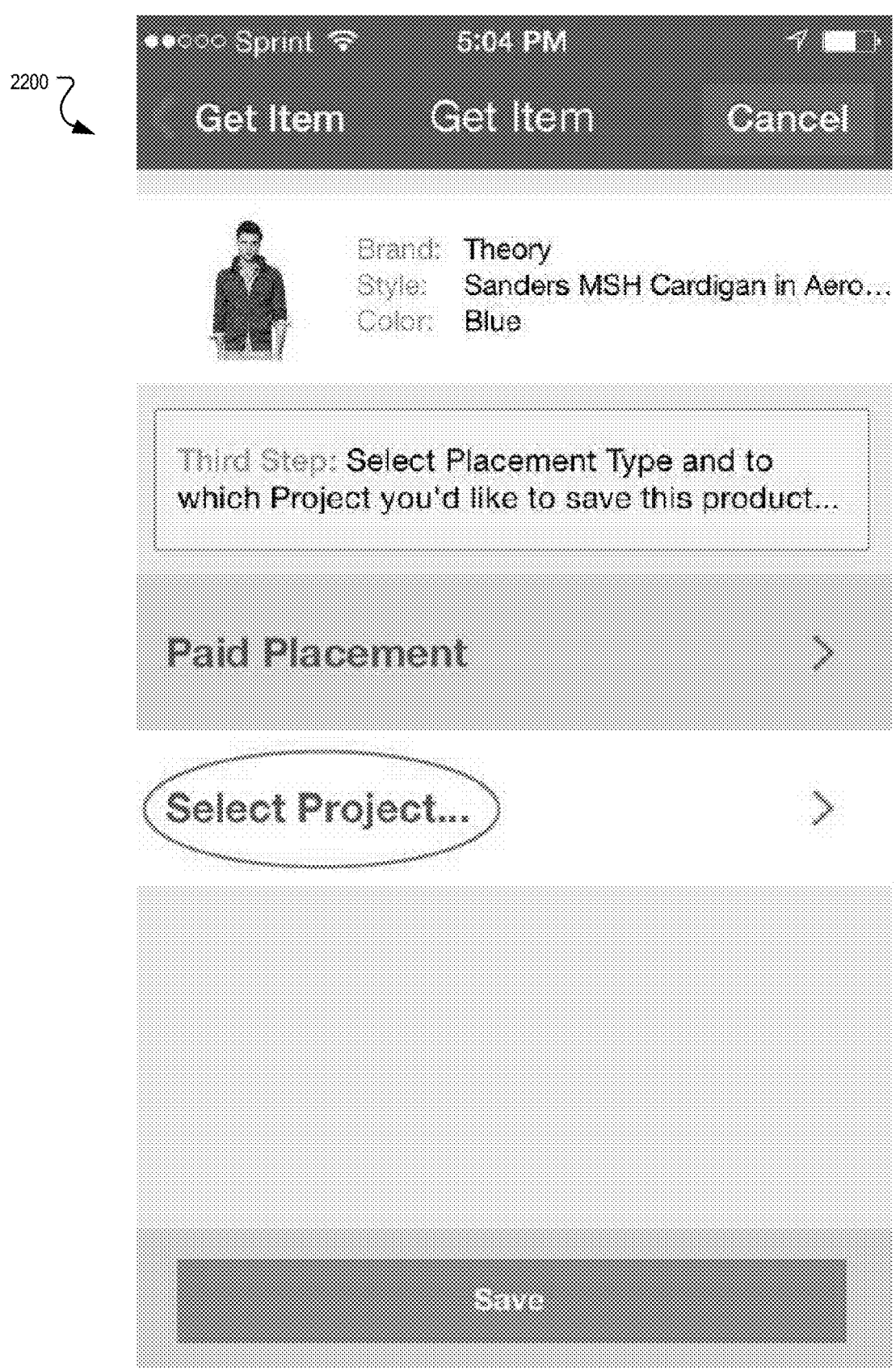

FIG. 22 shows a screenshot 2200 of a user interface displayed on a display 204 of the studio client computing device 102 that includes resources and data transmitted by the product placement server application 602 of the server computing device 106. The user interface shown in screenshot 2200 is a user interface for selecting a project for the item. As shown in FIG. 22, the user has selected a "Paid Placement" and to select a project, the user selects "Select Project."

Figure 23:
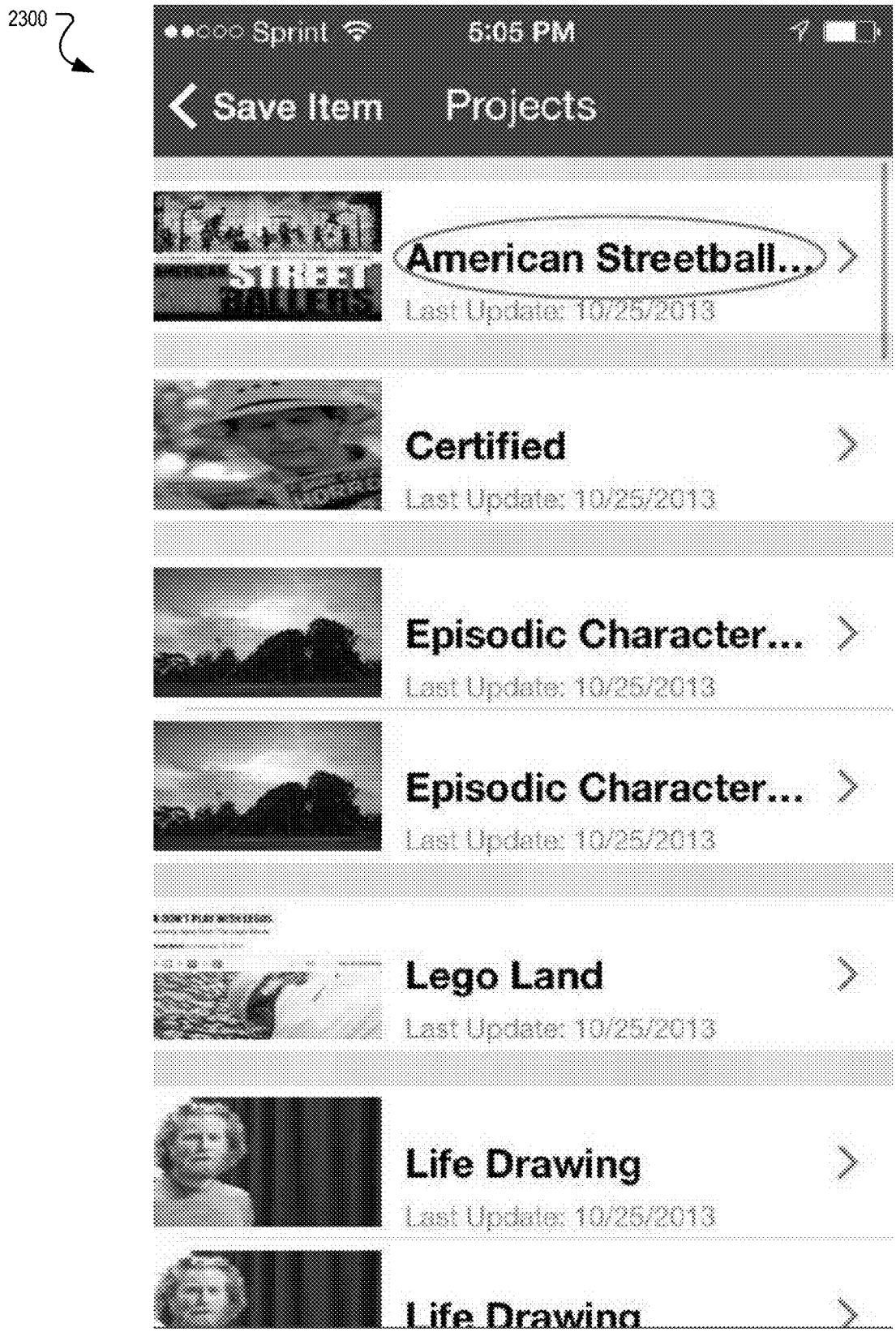

FIG. 23 shows a screenshot 2300 of a user interface displayed on a display 204 of the studio client computing device 102 that includes resources and data transmitted by the product placement server application 602 of the server computing device 106. The user interface shown in screenshot 2300 is a user interface for selecting a project for the item. FIG. 23 shows a list of available projects for selection and in this case, the user selects American Streetballers.

Figure 24:
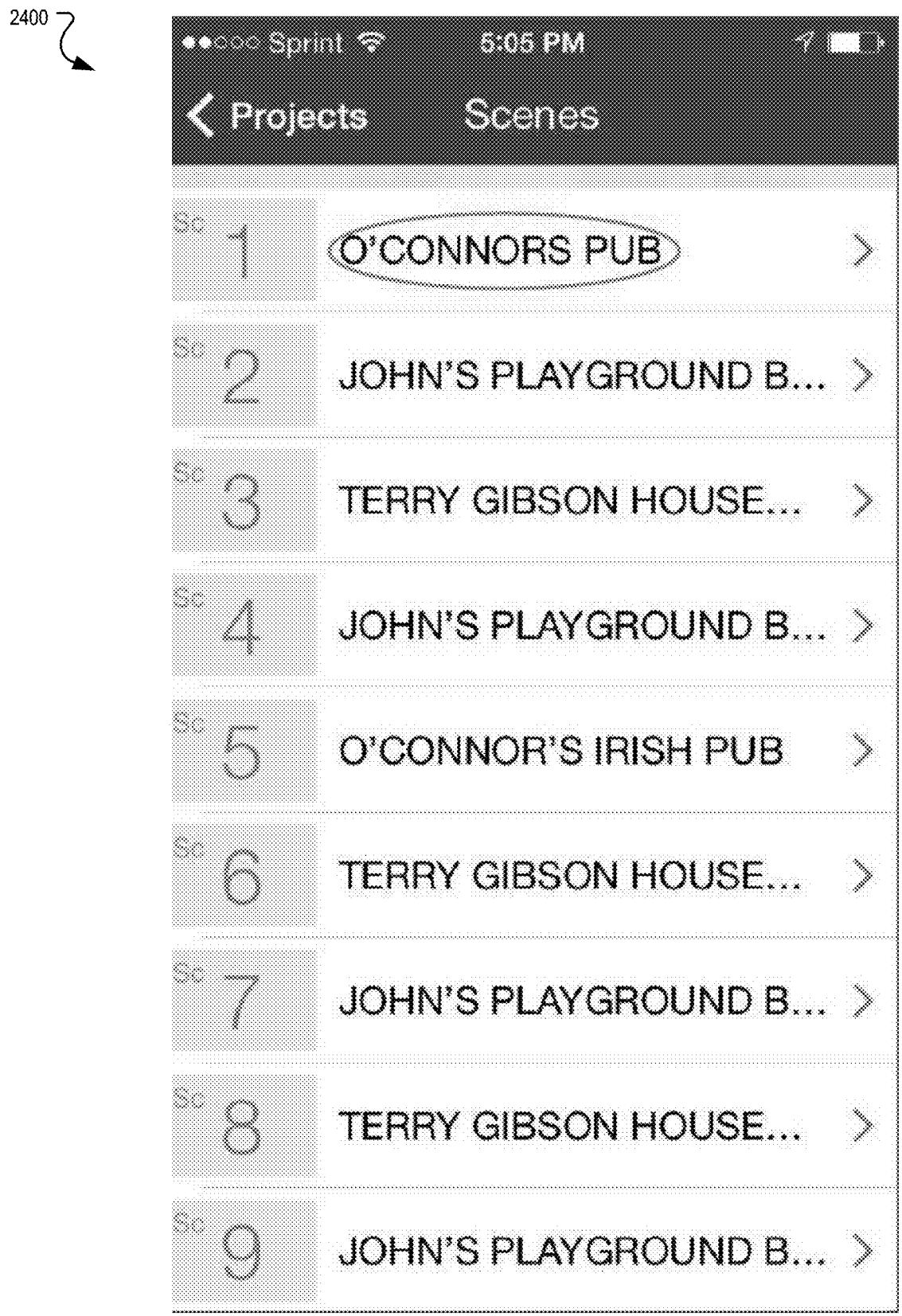

FIG. 24 shows a screenshot 2400 of a user interface displayed on a display 204 of the studio client computing device 102 that includes resources and data transmitted by the product placement server application 602 of the server computing device 106. The user interface shown in screenshot 2400 is a user interface for selecting a scene of the project. FIG. 24 shows a list of available scenes for selection and in this case, the user selects scene one, O'Connors Pub.

Figure 25:
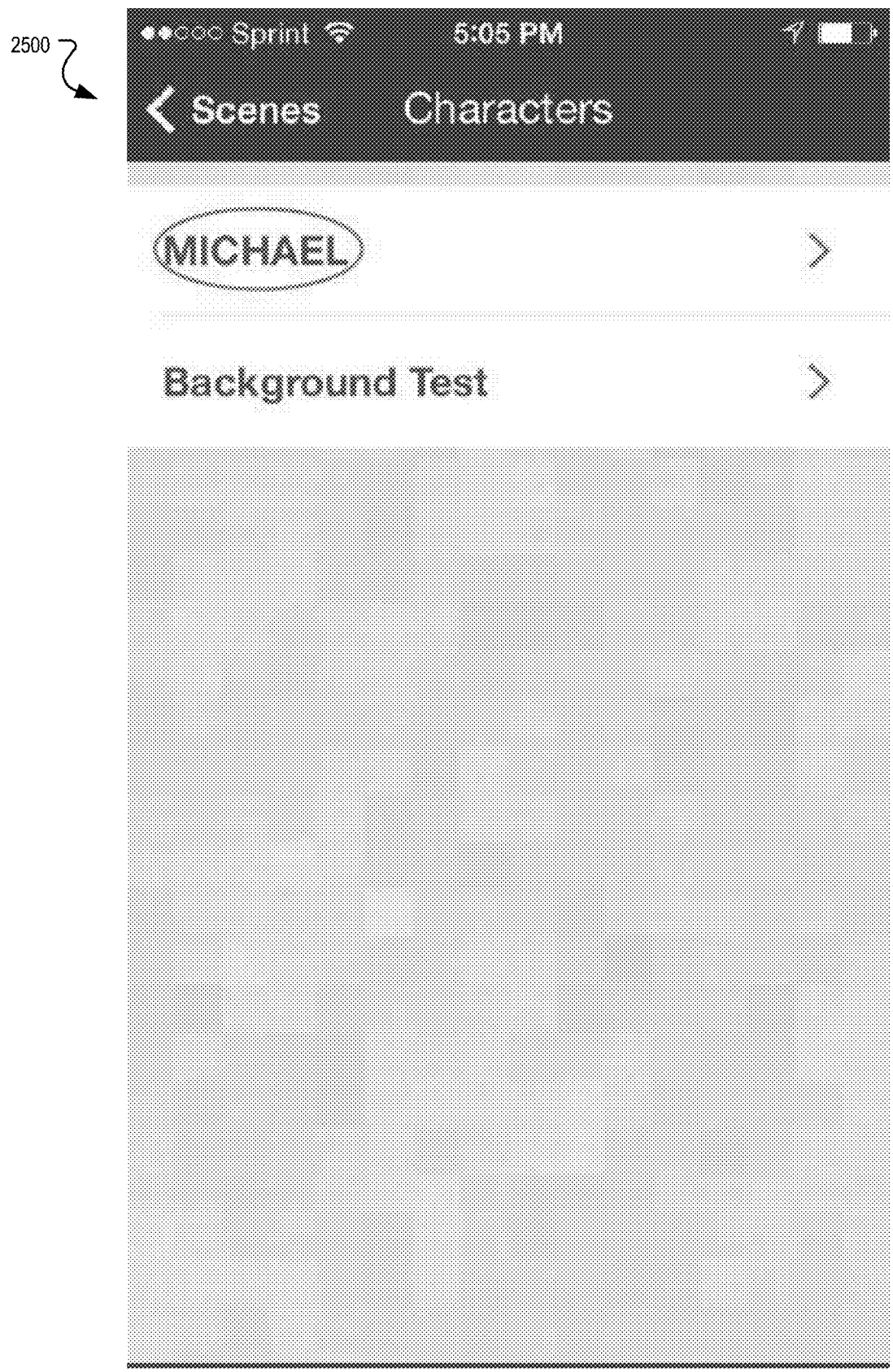

FIG. 25 shows a screenshot 2500 of a user interface displayed on a display 204 of the studio client computing device 102 that includes resources and data transmitted by the product placement server application 602 of the server computing device 106. The user interface shown in screenshot 2500 is a user interface for selecting a character in the scene of the project. FIG. 25 shows a list of available characters for selection and in this case, the user selects Michael.

Figure 26:
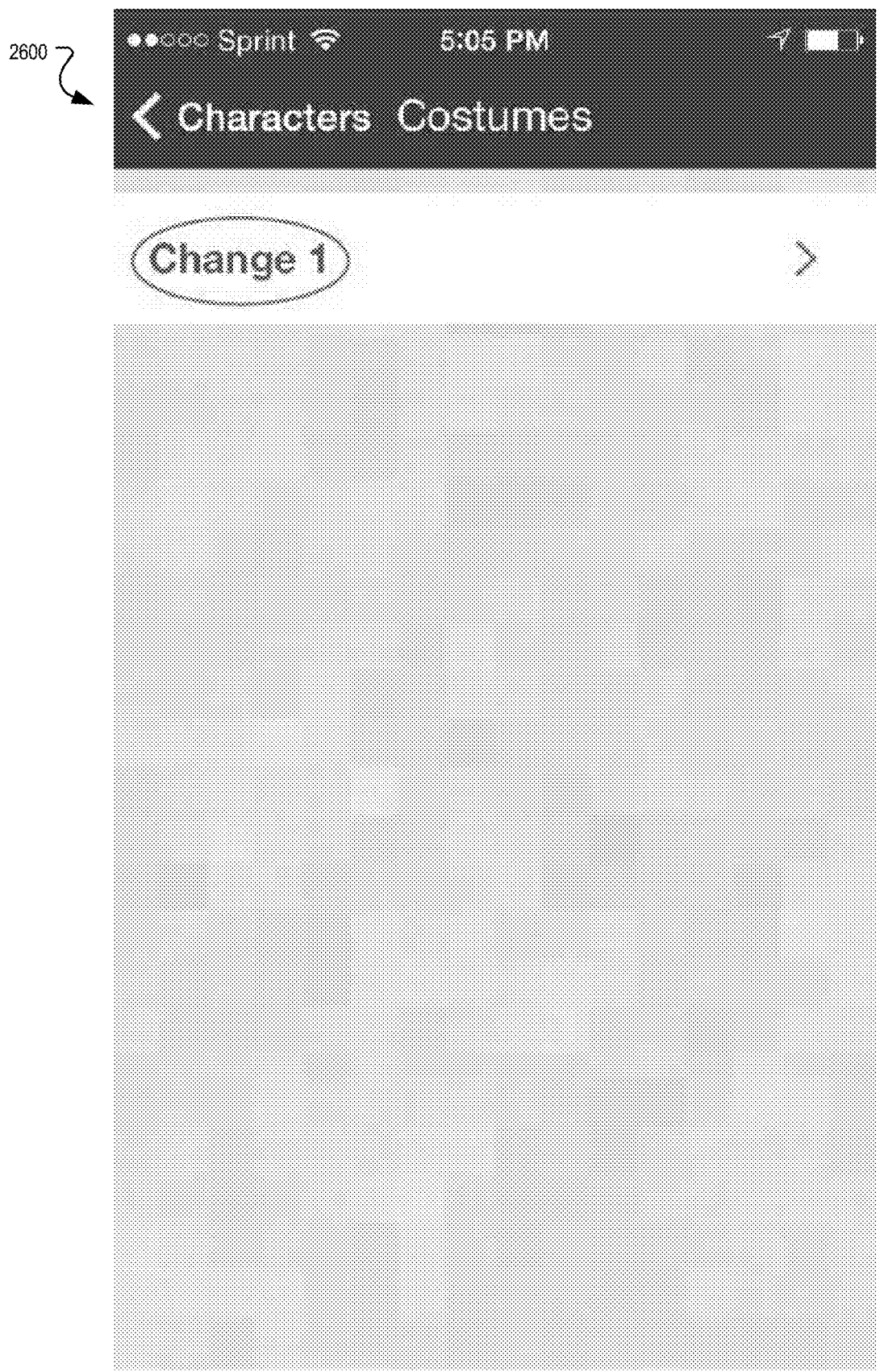

FIG. 26 shows a screenshot 2600 of a user interface displayed on a display 204 of the studio client computing device 102 that includes resources and data transmitted by the product placement server application 602 of the server computing device 106. The user interface shown in screenshot 2600 is a user interface for selecting a costume change for the character in the scene of the project. A "change" or a "costume change" is an industry term to describe a character costume for a given scene, e.g., "change 1" is a first costume for a character. FIG. 26 shows a list of available costume changes for selection and in this case, the user selects Change 1.

Figure 27:
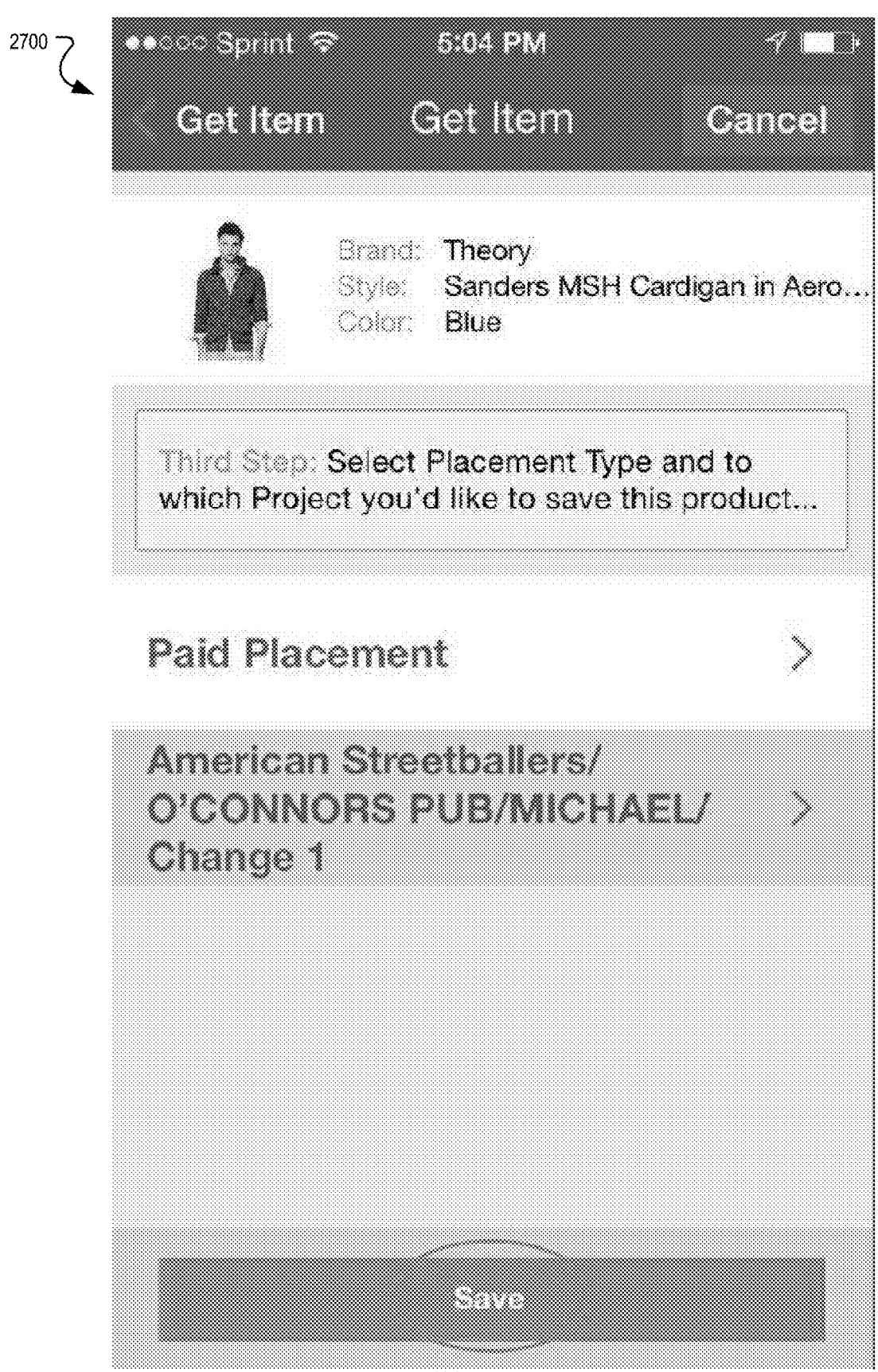

FIG. 27 shows a screenshot 2700 of a user interface displayed on a display 204 of the studio client computing device 102 that includes resources and data transmitted by the product placement server application 602 of the server computing device 106. The user interface shown in screenshot 2700 is a user interface for saving the product placement opportunity. As shown in FIG. 27, the user has selected paid placement and American Streetballers/O'Connors Pub/Michael/Change 1. The user selects the save button to save this product placement opportunity. When the user selects the save button, the studio client computing device 102 transmits information associated with the product placement opportunity to the server computing device 106. The server computing device 106 receives the information and stores the information in the database 108 and/or the memory 122 and notifies one or more fashion client computing devices 104 of the product placement opportunity.

Figure 28:
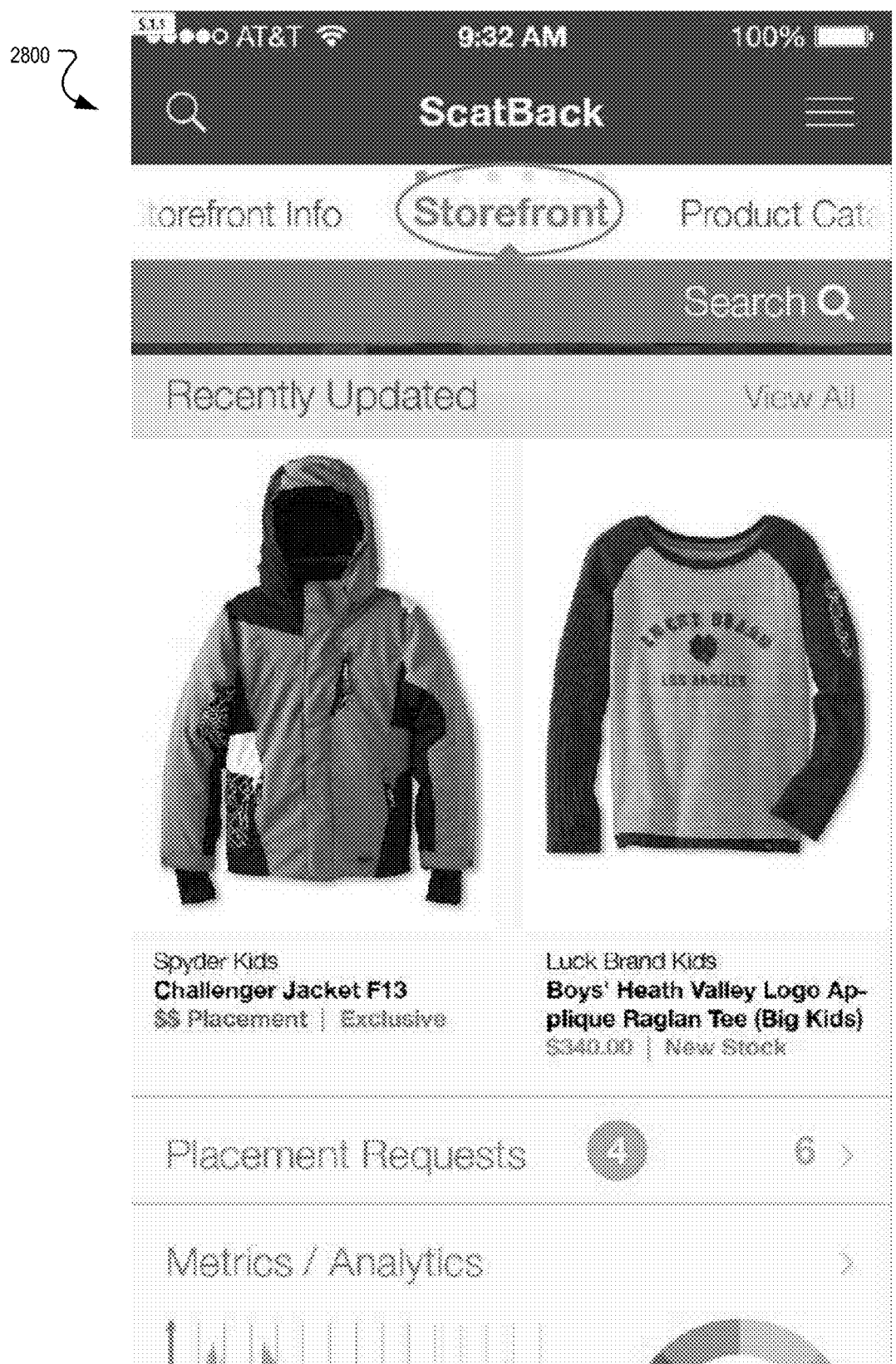

FIG. 28 shows a screenshot 2800 of a user interface displayed on a display 204 or 404 of the studio client computing device 102 or the fashion client computing device 104 that includes resources and data transmitted by the product placement server application 602 of the server computing device 106. The user interface shown in screenshot 2800 is a storefront user interface. The storefront user interface shows recently updated product placement opportunities, a placement requests menu, and metrics/analytics information associated with the product placement requests/opportunities.

Figure 29:
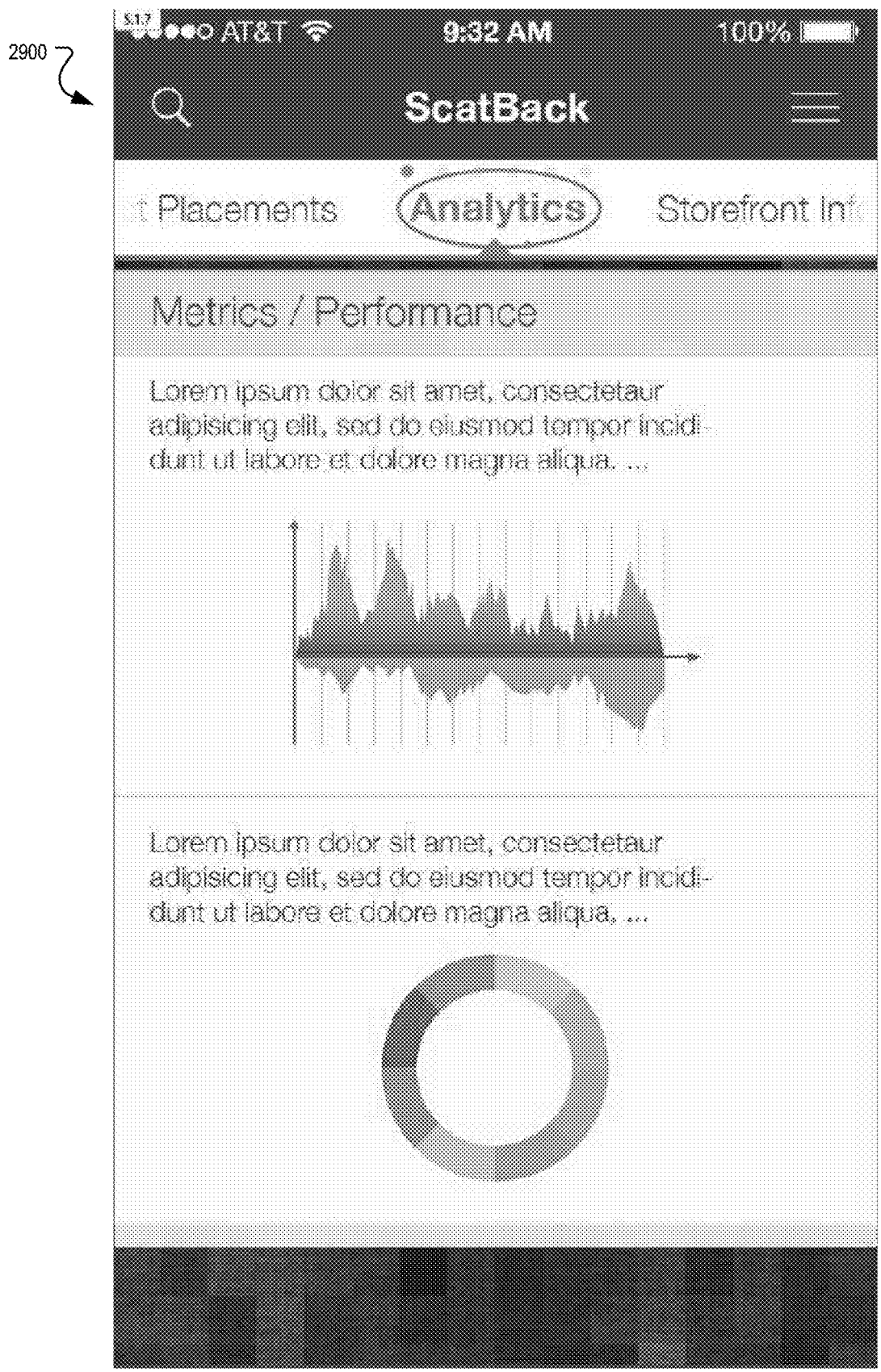

FIG. 29 shows a screenshot 2900 of a user interface displayed on a display 204 of the studio client computing device 102 or a display 404 of the fashion client computing device 104 that includes resources and data transmitted by the product placement server application 602 of the server computing device 106. The user interface shown in screenshot 2900 is an analytics user interface that shows information associated with product placement requests/opportunities.

Figure 30:
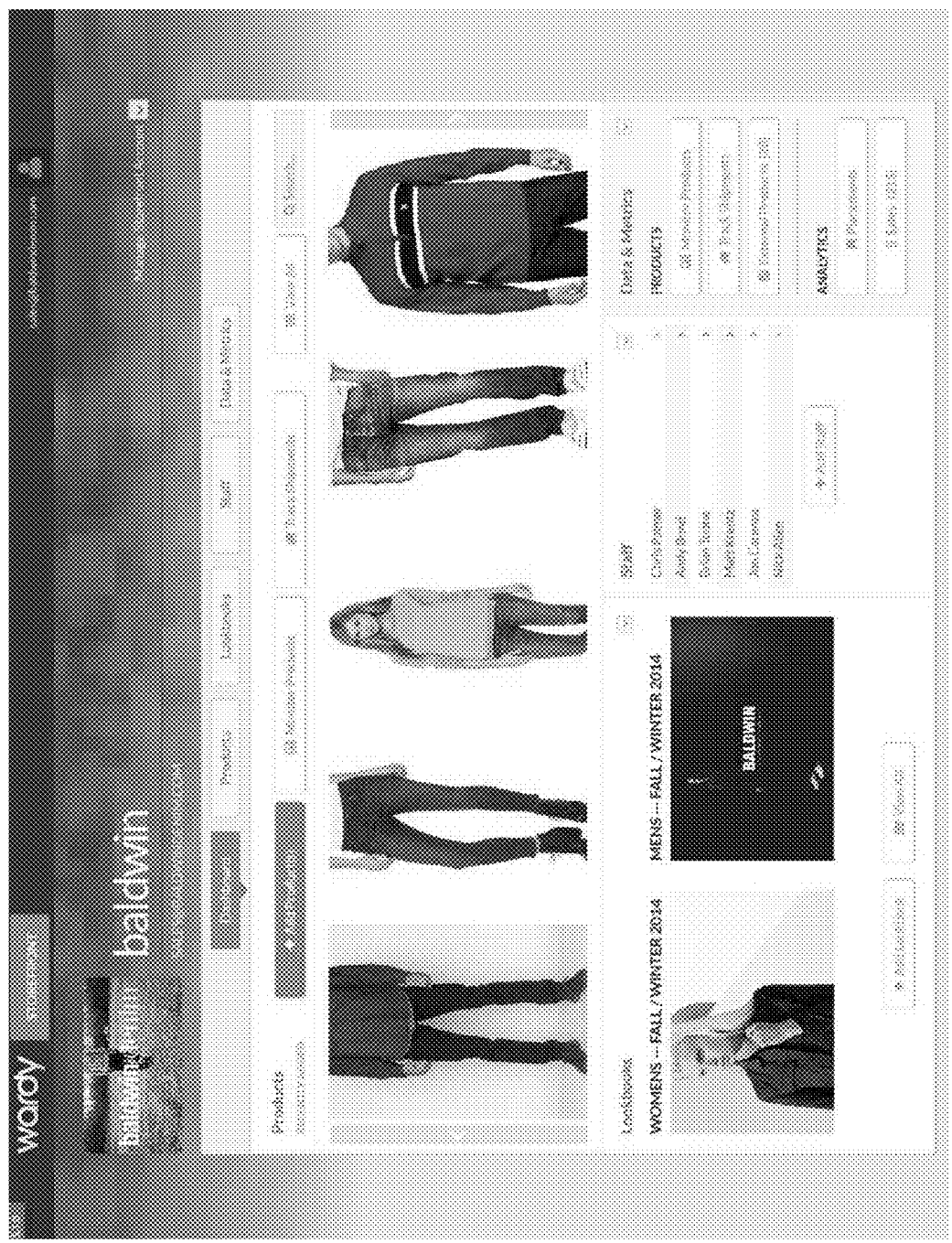

FIG. 30 shows a screenshot 3000 of a user interface displayed on a display 404 of the fashion client computing device 104 that includes resources and data transmitted by the product placement server application 602 of the server computing device 106. The user interface shown in screenshot 3000 is a storefront dashboard user interface. The storefront dashboard user interface includes a first user interface element, e.g., a button, for adding a new product to the product placement marketplace, a second user interface element for monitoring products, a third user interface element for tracking shipments, a fourth user interface element for viewing and managing product placement opportunities and analytics information, and a fifth user interface element for managing user lookbooks, among other user interface elements.

Figure 31:

FIG. 31 shows a screenshot 3100 of a user interface displayed on a display 404 of the fashion client computing device 104 that includes resources and data transmitted by the product placement server application 602 of the server computing device 106. The user interface shown in screenshot 3100 is a storefront metrics user interface for monitoring products placed in entertainment content via the product placement marketplace and associated data and metrics information. The list of products shown is sorted by most recent products, but also may be filtered based on other criteria including placement type among other criteria.

Figure 32:
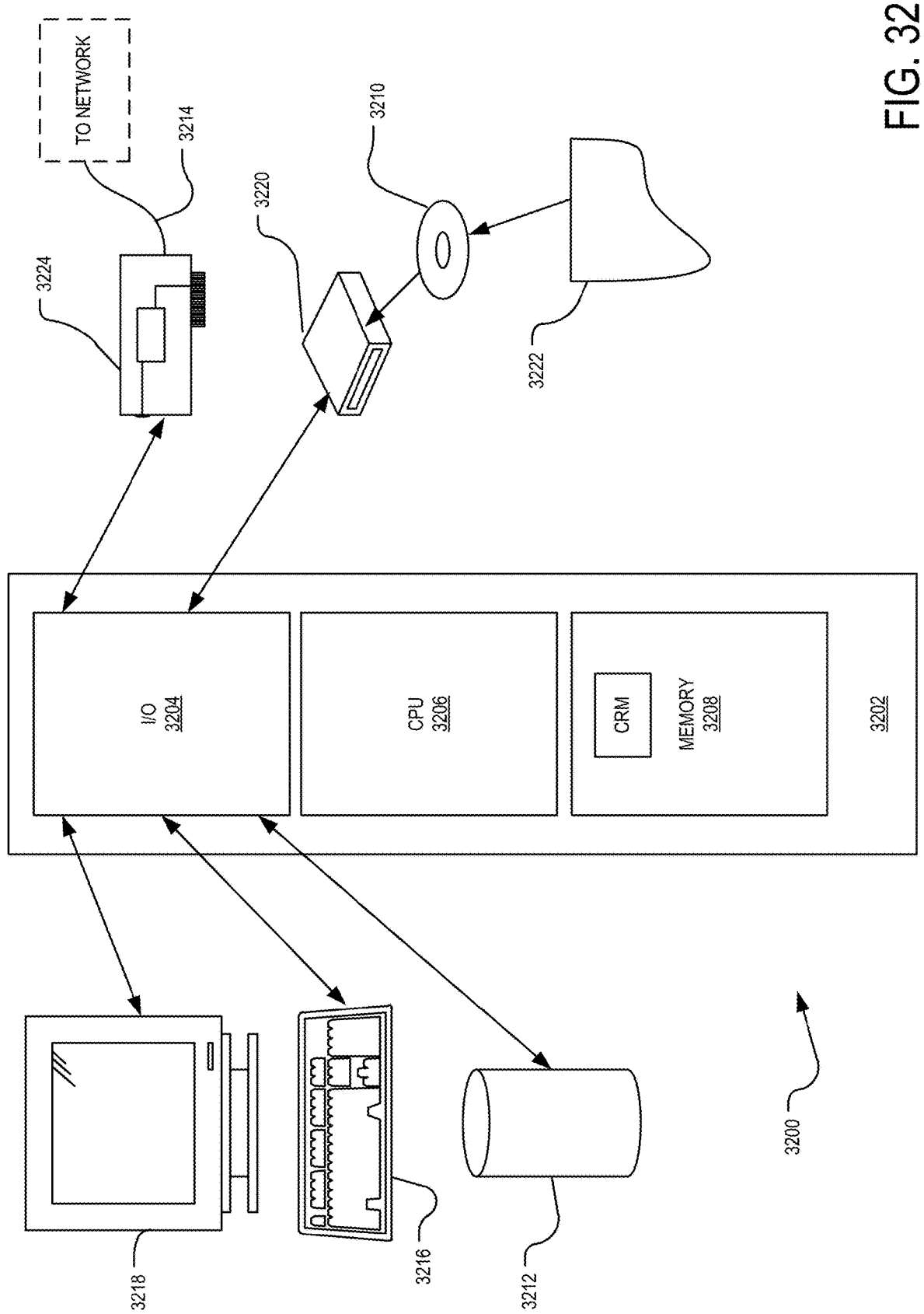
FIG. 32 illustrates a block diagram of an example computer device for use with the example embodiments.

FIG. 32 illustrates an example computing system 3200 that may implement various systems, such as the studio client computing device 102, the fashion client computing device 104, and the server computing device 106, and the methods discussed herein, such as processes 800 and 900. A general purpose computer system 3200 is capable of executing a computer program product to execute a computer process. Data and program files may be input to the computer system 3200, which reads the files and executes the programs therein such as the product placement studio application 202, the product placement fashion application 402, and the product placement server application 602. Some of the elements of a general purpose computer system 3200 are shown in FIG. 32 wherein a processor 3202 is shown having an input/output (I/O) section 3204, a central processing unit (CPU) 3206, and a memory section 3208. There may be one or more processors 3202, such that the processor 3202 of the computer system 3200 comprises a single central-processing unit 3206, or a plurality of processing units, commonly referred to as a parallel processing environment. The computer system 3200 may be a conventional computer, a server, a distributed computer, or any other type of computer, such as one or more external computers made available via a cloud computing architecture. The presently described technology is optionally implemented in software devices loaded in memory 3208, stored on a configured DVD/CD-ROM 3210 or storage unit 3212, and/or communicated via a wired or wireless network link 3214, thereby transforming the computer system 3200 in FIG. 32 to a special purpose machine for implementing the described operations.

The memory section 3208 may be volatile media, nonvolatile media, removable media, non-removable media, and/or other media or mediums that can be accessed by a general purpose or special purpose computing device. For example, the memory section 3208 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 3204 is connected to one or more user-interface devices (e.g., a keyboard 3216 and a display unit 3218), a disc storage unit 3212, and a disc drive unit 3220. Generally, the disc drive unit 3220 is a DVD/CD-ROM drive unit capable of reading the DVD/CD-ROM medium 3210, which typically contains programs and data 3222. Computer program products containing mechanisms to effectuate the systems and methods in accordance with the presently described technology may reside in the memory section 3204, on a disc storage unit 3212, on the DVD/CD-ROM medium 3210 of the computer system 3200, or on external storage devices made available via a cloud computing architecture with such computer program products, including one or more database management products, web server products, application server products, and/or other additional software components. Alternatively, a disc drive unit 3220 may be replaced or supplemented by a floppy drive unit, a tape drive unit, or other storage medium drive unit. The network adapter 3224 is capable of connecting the computer system 3200 to a network via the network link 3214, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 3200 is connected (by wired connection and/or wirelessly) to a local network through the network interface or adapter 3224, which is one type of communications device. When used in a WAN-networking environment, the computer system 3200 typically includes a modem, a network adapter, or any other type of communications device for establishing communications over the wide area network. In a networked environment, program modules depicted relative to the computer system 3200 or portions thereof, may be stored in a remote memory storage device. It is appreciated that the network connections shown are examples of communications devices for and other means of establishing a communications link between the computers may be used.

In an example implementation, source code executed by the studio client computing device 102, the fashion client computing device 104, and the server computing device 106, a plurality of internal and external databases, source databases, and/or cached data on servers are stored in the database 108, memory 114 of the studio client computing device 102, memory 118 of the fashion client computing device 104, memory 122 of the server computing device 106, or other storage systems, such as the disk storage unit 3212 or the DVD/CD-ROM medium 3210, and/or other external storage devices made available and accessible via a network architecture. The source code executed by the studio client computing device 102, the fashion client computing device 104, and the server computing device 106 may be embodied by instructions stored on such storage systems and executed by the processor 3202.

Some or all of the operations described herein may be performed by the processor 3202, which is hardware. Further, local computing systems, remote data sources and/or services, and other associated logic represent firmware, hardware, and/or software configured to control operations of the product placement system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 3202 and a user may interact with a Graphical User Interface (GUI) using one or more user-interface devices (e.g., the keyboard 3216, the display unit 3218, and the user devices 3204) with some of the data in use directly coming from online sources and data stores. The system set forth in FIG. 32 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
   at least one processor to:
   receive an electronic script document comprising text associated with an entertainment production from a studio client computing device and parse the electronic script document to determine a product placement opportunity for at least one clothing item;
   receive at least one uploaded photograph of one of an example clothing item and an object;
   determine at least one color element in one of the example clothing item and the object;
   determine a list of at least one clothing item having the at least one color element;
   receive the product placement opportunity for the at least one clothing item from the studio client computing device and store information associated with the product placement opportunity in a memory;
   transmit the information associated with the product placement opportunity and the list of the at least one clothing item having the at least one color element to at least one fashion client computing device;
   receive an acceptance of the product placement opportunity including a selected clothing item from the list of the at least one clothing item having the at least one color element from a fashion client computing device and transmit information associated with the acceptance to the studio client computing device;
   receive a payment from at least one of the studio client computing device and the fashion client computing device and hold the payment in escrow;
   determine that a viewer is viewing one of a television show and a movie; and
   transmit a real-time notification to a viewer client computing device of a viewer that at least one clothing item is being shown on screen,
   wherein the notification provides information regarding the at least one clothing item and allows for direct interaction between the viewer and the viewer client computing device to purchase the at least one clothing item shown on the screen.

2. The system of claim 1, the at least one processor further to:
   receive a counteroffer for the product placement opportunity from one of the studio client computing device and the fashion client computing device, the counteroffer modifying at least one term of the product placement opportunity;
   transmit information associated with the counteroffer to one of the studio client computing device and the fashion client computing device; and
   receive an acceptance of the counteroffer for the product placement opportunity from one of the studio client computing device and the fashion client computing device and transmit information associated with the acceptance to the studio client computing device and the fashion client computing device.

3. The system of claim 1, the at least one processor further to:
   receive a request from one of the fashion client computing device and the studio client computing device for marketplace information comprising a list of at least one currently pending product placement opportunity; and
   transmit information associated with the list of the at least one currently pending product placement opportunity to one of the fashion client computing device and the studio client computing device, the list sorted based on a particular product placement opportunity variable.

4. The system of claim 1, wherein the product placement opportunity comprises one of a paid placement, a promotional placement, a pull placement, and a purchase placement.

5. The system of claim 1, the at least one processor further to:
   store information associated with at least one studio user in the memory, the information associated with the at least one studio user comprising at least one of username information, password information, name information, address information, payment information, contact information, and project information; and
   store information associated with at least one fashion user in the memory, the information associated with the at least one fashion user comprising username information, password information, name information, address information, payment information, contact information, and clothing information.

6. The system of claim 1, the at least one processor further to:
   store statistical information associated with the accepted product placement opportunity in the memory, the statistical information comprising at least one of a start time of the product placement opportunity, a need-by time for the product placement opportunity, an ending time of the product placement opportunity, an acceptance time of the product placement opportunity, an associated studio user for the product placement opportunity, an associated fashion user for the product placement opportunity, an associated project, an associated season, an associated episode, product time on screen, a number of scenes on screen, an associated character, an associated scene, an associated product, a type of product placement opportunity, a quantity, pricing information, and counteroffer information.

7. The system of claim 6, the at least one processor further to:
   transmit a graph based on the statistical information associated with the accepted product placement opportunity to one of the studio client computing device and the fashion client computing device, wherein the graph is one of a pie graph, a bar graph, and a line graph.

8. The system of claim 1, the at least one processor further to:
release the payment from escrow when a contract associated with the accepted product placement agreement has been fulfilled.

9. The system of claim 1, wherein the product placement agreement is for an on-screen personality in one of an episodic project and a feature-length project.

10. The system of claim 2, wherein the counteroffer modifies one of a quantity, a need-by date, a price, a type of product placement, product time on screen, a number of scenes on screen, and a size.

11. The system of claim 1, wherein the payment comprises a fee for the product placement agreement.

12. A method, comprising:
receiving, by at least one processor, an electronic script document comprising text associated with an entertainment production from a studio client computing device and parsing the electronic script document to determine a product placement opportunity for at least one clothing item;
receiving, by the at least one processor, the product placement opportunity for the at least one clothing item from the studio client computing device and storing information associated with the product placement opportunity in a memory;
receiving, by the at least one processor, at least one uploaded photograph of one of an example clothing item and an object;
determining, by the at least one processor, at least one color element in one of the example clothing item and the object;
determining, by the at least one processor, a list of at least one clothing item having the at least one color element;
transmitting, by the at least one processor, the information associated with the product placement opportunity and the list of the at least one clothing item having the at least one color element to at least one fashion client computing device;
receiving, by the at least one processor, an acceptance of the product placement opportunity including a selected clothing item from the list of the at least one clothing item having the at least one color element from a fashion client computing device and transmitting information associated with the acceptance to the studio client computing device;
receiving, by the at least one processor, a payment from at least one of the studio client computing device and the fashion client computing device and holding the payment in escrow;
determining, by the at least one processor, that a viewer is viewing one of a television show and a movie; and
transmitting, by the at least one processor, a real-time notification to a viewer client computing device of a viewer that at least one clothing item is being shown on screen,
wherein the notification provides information regarding the at least one clothing item and allows for direct interaction between the viewer and the viewer client computing device to purchase the at least one clothing item shown on the screen.

13. The method of claim 12, further comprising:
receiving a counteroffer for the product placement opportunity from one of the studio client computing device and the fashion client computing device, the counteroffer modifying at least one term of the product placement opportunity;
transmitting information associated with the counteroffer to one of the studio client computing device and the fashion client computing device; and
receiving an acceptance of the counteroffer for the product placement opportunity from one of the studio client computing device and the fashion client computing device and transmitting information associated with the acceptance to the studio client computing device and the fashion client computing device.

14. The method of claim 12, further comprising:
receiving a request from the fashion client computing device for marketplace information comprising a list of at least one currently pending product placement opportunity; and
transmitting information associated with the list of the at least one currently pending product placement opportunity to the fashion client computing device, the list sorted based on a particular product placement opportunity variable.

15. The method of claim 12, wherein the product placement opportunity comprises one of a paid placement, a promotional placement, a pull placement, and a purchase placement.

16. The method of claim 12, further comprising:
storing information associated with at least one studio user in the memory, the information associated with the at least one studio user comprising at least one of username information, password information, name information, address information, payment information, contact information, and project information; and
storing information associated with at least one fashion user in the memory, the information associated with the at least one fashion user comprising username information, password information, name information, address information, payment information, contact information, and clothing information.

17. The method of claim 12, further comprising:
storing statistical information associated with the accepted product placement opportunity in the memory, the statistical information comprising at least one of a start time of the product placement opportunity, a need-by time for the product placement opportunity, an ending time of the product placement opportunity, an acceptance time of the product placement opportunity, an associated studio user for the product placement opportunity, an associated fashion user for the product placement opportunity, an associated project, an associated season, an associated episode, product time on screen, a number of scenes on screen, an associated character, an associated scene, an associated product, a type of product placement opportunity, a quantity, pricing information, and counteroffer information.

18. The method of claim 17, further comprising:
transmitting a graph based on the statistical information associated with the accepted product placement opportunity to one of the studio client computing device and the fashion client computing device, wherein the graph is one of a pie graph, a bar graph, and a line graph.

19. The method of claim 12, further comprising:
releasing the payment from escrow when a contract associated with the accepted product placement agreement has been fulfilled.

20. The method of claim 12, wherein the product placement agreement is for an on-screen personality in one of an episodic project and a feature-length project.

21. The method of claim 13, wherein the counteroffer modifies one of a quantity, a need-by date, a price, a type of product placement, product time on screen, a number of scenes on screen, and a size.

22. The method of claim 12, wherein the payment comprises a fee for the product placement agreement.

23. A non-transitory computer-readable medium having instructions stored thereon that, when executed by at least one processor, cause the at least one processor to perform operations comprising:
receiving an electronic script document comprising text associated with an entertainment production from a studio client computing device and parsing the electronic script document to determine a product placement opportunity for at least one clothing item;
receiving at least one uploaded photograph of one of an example clothing item and an object;
determining at least one color element in one of the example clothing item and the object;
determining a list of at least one clothing item having the at least one color element;
receiving the product placement opportunity for the at least one clothing item from the studio client computing device and storing information associated with the product placement opportunity in a memory;
transmitting the information associated with the product placement opportunity and the list of the at least one clothing item having the at least one color element to at least one fashion client computing device;
receiving an acceptance of the product placement opportunity including a selected clothing item from the list of the at least one clothing item having the at least one color element from a fashion client computing device and transmitting information associated with the acceptance to the studio client computing device;
receiving a payment from at least one of the studio client computing device and the fashion client computing device and holding the payment in escrow;
determining that a viewer is viewing one of a television show and a movie; and
transmitting a real-time notification to a viewer client computing device of a viewer that at least one clothing item is being shown on screen,
wherein the notification provides information regarding the at least one clothing item and allows for direct interaction between the viewer and the viewer client computing device to purchase the at least one clothing item shown on the screen.

24. The non-transitory computer-readable medium of claim 23, the operations further comprising:
receiving a counteroffer for the product placement opportunity from one of the studio client computing device and the fashion client computing device, the counteroffer modifying at least one term of the product placement opportunity;
transmitting information associated with the counteroffer to one of the studio client computing device and the fashion client computing device; and
receiving an acceptance of the counteroffer for the product placement opportunity from one of the studio client computing device and the fashion client computing device and transmitting information associated with the acceptance to the studio client computing device and the fashion client computing device.

25. The non-transitory computer-readable medium of claim 23, the operations further comprising:
receiving a request from the fashion client computing device for marketplace information comprising a list of at least one currently pending product placement opportunity; and
transmitting information associated with the list of the at least one currently pending product placement opportunity to the fashion client computing device, the list sorted based on a particular product placement opportunity variable.

26. The non-transitory computer-readable medium of claim 23, wherein the product placement opportunity comprises one of a paid placement, a promotional placement, a pull placement, and a purchase placement.

27. The non-transitory computer-readable medium of claim 23, the operations further comprising:
storing information associated with at least one studio user in the memory, the information associated with the at least one studio user comprising at least one of username information, password information, name information, address information, payment information, contact information, and project information; and
storing information associated with at least one fashion user in the memory, the information associated with the at least one fashion user comprising username information, password information, name information, address information, payment information, contact information, and clothing information.

28. The non-transitory computer-readable medium of claim 23, the operations further comprising:
storing statistical information associated with the accepted product placement opportunity in the memory, the statistical information comprising at least one of a start time of the product placement opportunity, a need-by time for the product placement opportunity, an ending time of the product placement opportunity, an acceptance time of the product placement opportunity, an associated studio user for the product placement opportunity, an associated fashion user for the product placement opportunity, an associated project, an associated season, an associated episode, product time on screen, a number of scenes on screen, an associated character, an associated scene, an associated product, a type of product placement opportunity, a quantity, pricing information, and counteroffer information.

29. The non-transitory computer-readable medium of claim 28, the operations further comprising:
transmitting a graph based on the statistical information associated with the accepted product placement opportunity to one of the studio client computing device and the fashion client computing device, wherein the graph is one of a pie graph, a bar graph, and a line graph.

30. The non-transitory computer-readable medium of claim 23, the operations further comprising:
releasing the payment from escrow when a contract associated with the accepted product placement agreement has been fulfilled.

31. The non-transitory computer-readable medium of claim 23, wherein the product placement agreement is for an on-screen personality in one of an episodic project and a feature-length project.

32. The non-transitory computer-readable medium of claim 24, wherein the counteroffer modifies one of a quantity, a need-by date, a price, a type of product placement, product time on screen, a number of scenes on screen, and a size.

33. The non-transitory computer-readable medium of claim 23, wherein the payment comprises a fee for the product placement agreement.

* * * * *